(12) United States Patent
Wifvesson et al.

(10) Patent No.: US 12,574,725 B2
(45) Date of Patent: *Mar. 10, 2026

(54) METHODS, APPARATUSES, COMPUTER PROGRAMS AND CARRIERS FOR SECURITY MANAGEMENT BEFORE HANDOVER FROM 5G TO 4G SYSTEM

(71) Applicant: TELEFONAKTIEBOLAGET LM ERICSSON (PUBL), Stockholm (SE)

(72) Inventors: Monica Wifvesson, Lund (SE); Noamen Ben Henda, Vällingby (SE); Vesa Lehtovirta, Espoo (FI); Christine Jost, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,260

(22) Filed: Apr. 16, 2024

(65) Prior Publication Data

US 2024/0276211 A1 Aug. 15, 2024

Related U.S. Application Data

(63) Continuation of application No. 18/108,523, filed on Feb. 10, 2023, now Pat. No. 11,963,000, which is a (Continued)

(51) Int. Cl.
H04L 9/00 (2022.01)
H04L 9/08 (2006.01)
(Continued)

(52) U.S. Cl.
CPC ......... *H04W 12/041* (2021.01); *H04L 9/0861* (2013.01); *H04W 12/0433* (2021.01);
(Continued)

(58) Field of Classification Search
CPC ........................ H04W 12/041; H04W 12/0433
See application file for complete search history.

(56) References Cited

U.S. PATENT DOCUMENTS

2010/0130207 A1 5/2010 Wu
2011/0092213 A1* 4/2011 Forsberg ............. H04W 12/041
455/436

(Continued)

FOREIGN PATENT DOCUMENTS

CN 101889423 A 11/2010
CN 101931951 A 12/2010
(Continued)

OTHER PUBLICATIONS

3GPP TR 33.899 V1.3.0, "3rd Generation Partnership Project; Technical Specification Group Services and System Aspects; Study on the security aspects of the next generation system (Release 14)", 3GPP TR 33.899 V1.3.0, Aug. 2017.
(Continued)

*Primary Examiner* — Christopher J Brown
(74) *Attorney, Agent, or Firm* — Withrow & Terranova, PLLC

(57) ABSTRACT

A key management is provided that enables security activation before handing over a user equipment from a source 5G wireless communication system, i.e., a Next Generation System (NGS), to a target 4G wireless communication system, i.e., a Evolved Packet System (EPS)/Long Term Evolution (LTE). The key management achieves backward security, i.e., prevents the target 4G wireless communication system from getting knowledge of 5G security information used in the source 5G wireless communication system.

20 Claims, 14 Drawing Sheets

Related U.S. Application Data continuation of application No. 16/481,751, filed as application No. PCT/EP2017/081687 on Dec. 6, 2017, now Pat. No. 11,849,316.

(60) Provisional application No. 62/451,860, filed on Jan. 30, 2017.

(51) Int. Cl.
| | |
|---|---|
| *H04W 12/041* | (2021.01) |
| *H04W 12/0433* | (2021.01) |
| *H04W 36/00* | (2009.01) |
| *H04W 36/14* | (2009.01) |
| *H04W 12/00* | (2021.01) |

(52) U.S. Cl.
CPC ... *H04W 36/0055* (2013.01); *H04W 36/0064* (2023.05); *H04W 36/14* (2013.01); *H04W 36/1443* (2023.05); *H04W 12/009* (2019.01)

(56) References Cited

U.S. PATENT DOCUMENTS

| | | | |
|---|---|---|---|
| 2015/0215987 A1 | 7/2015 | Kim et al. | |
| 2015/0269028 A1* | 9/2015 | Horn ................. | H04W 36/0038 |
| | | | 714/4.1 |
| 2016/0127897 A1* | 5/2016 | Lee ....................... | H04W 12/04 |
| | | | 455/410 |
| 2016/0191471 A1 | 6/2016 | Ryoo et al. | |
| 2018/0013568 A1 | 1/2018 | Muhanna et al. | |
| 2018/0063707 A1 | 3/2018 | Lee et al. | |

FOREIGN PATENT DOCUMENTS

| | | | |
|---|---|---|---|
| CN | 101946535 A | 1/2011 |
| CN | 101953191 A | 1/2011 |
| KR | 1020110040831 A | 4/2011 |
| KR | 1020140130478 A | 11/2014 |
| KR | 1020150013336 A | 2/2015 |
| KR | 1020160037210 A | 4/2016 |

OTHER PUBLICATIONS

3GPP, "3rd Generation Partnership Project; Technical Specification Group Services and System Aspects; 3G Security; Security Architecture (Release 14)", Technical Specification, 3GPP TS 33.102 V14.1.0, Mar. 1, 2017, pp. 1-77.

3GPP, "3rd Generation Partnership Project; Technical Specification Group Services and System Aspects; 3GPP System Architecture Evolution (SAE); Security architecture (Release 14)", TS 33.401 V14.1.0, Dec. 2016.

3GPP, "3rd Generation Partnership Project; Technical Specification Group Services and System Aspects; Study on Architecture for Next Generation System (Release 14)", TR 23.799 V14.0.0, Dec. 2016.

3GPP, "3rd Generation Partnership Project; Technical Specification Group Services and System Aspects; Study on the security aspects of the next generation system (Release 14)", 3GPP TR 33.899 V0.6.0, Nov. 25, 2016.

3GPP, "Technical Specification, 3rd Generation Partnership Project; Technical Specification Group Services and System Aspects; 3GPP System Architecture Evolution (SAE); Security architecture (Release 15)", 3GPP TS 33.401 V15.2.0, Jan. 2018.

Ericsson, "Solution on inter-working handover from 5G Next Gen to EPC using Nx interface", 3GPP TSG SA WG3 (Security) Meeting #86-Bis, S3-170791, Mar. 27-31, 2017, Busan (South Korea).

The First Office Action for Chinese Patent Application No. 201780085148.1, issued Jul. 21, 2021, 18 pages.

The Second Office Action for Chinese Patent Application No. 201780085148.1, issued Feb. 25, 2022, 9 pages.

The Third Office Action for Chinese Patent Application No. 201780085148.1, issued Jul. 21, 2022, 8 pages.

Intention to Grant for European Patent Application No. 17811286.8, mailed Oct. 23, 2020, 8 pages.

Written Opinion for Korean Patent Application No. 10-2019-7023671, mailed Apr. 7, 2020, 5 pages.

Office Patent Decision for Korean Patent Application No. 10-2019-7023671, mailed Jun. 30, 2020, 4 pages.

Written Decision on Registration for Korean Patent Application No. 10-2020-7019445, mailed Sep. 14, 2020, 4 pages.

* cited by examiner

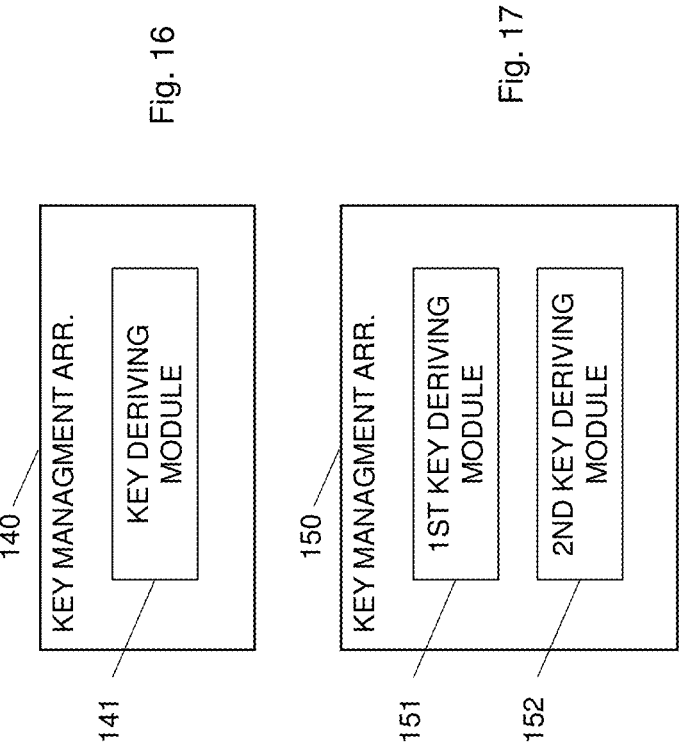
Fig. 16
Fig. 17
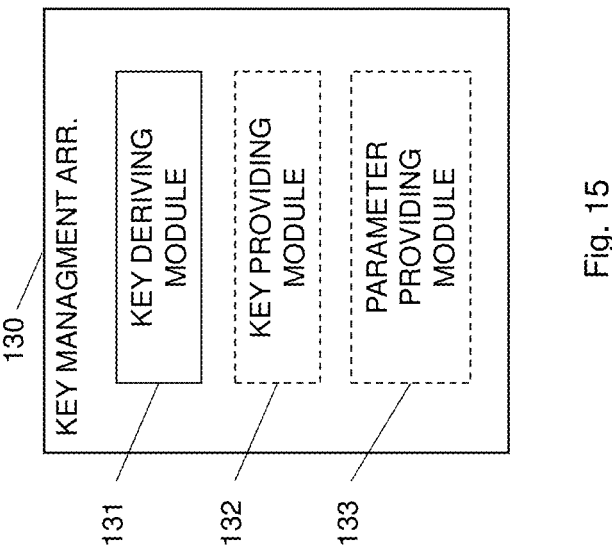
Fig. 15

1

METHODS, APPARATUSES, COMPUTER PROGRAMS AND CARRIERS FOR SECURITY MANAGEMENT BEFORE HANDOVER FROM 5G TO 4G SYSTEM

PRIORITY CLAIM

This application is a continuation application of U.S. patent application Ser. No. 18/108,523, filed Feb. 10, 2023, and granted as U.S. Pat. No. 11,963,000 on Apr. 16, 2024, which is a continuation application of U.S. patent application Ser. No. 16/481,751, filed Jul. 29, 2019, and granted as U.S. Pat. No. 11,849,316 on Dec. 19, 2023, which is a national stage application of International Patent Application No. PCT/EP2017/081687, filed Dec. 6, 2017, which claims priority to U.S. Patent Application No. 62/451,860, filed on Jan. 30, 2017, the disclosure disclosures of which are hereby incorporated in their entirety by reference.

TECHNICAL FIELD

The present embodiments generally relate to security management, and in particular to key management in connection with handover between different generations of wireless communication systems.

BACKGROUND

It may be useful to start with a very brief overview of the Universal Mobile Telecommunications System (UMTS) architecture, sometimes also referred to as 3G, and the Long Term Evolution (LTE) architecture also referred to as 4G.

To start with, the Radio Access Network (RAN) part of the architectures differs in that Universal Terrestrial Radio Access Network (UTRAN) is the 3G UMTS RAN and Evolved UTRAN (E-UTRAN) is the LTE RAN. UTRAN supports both circuit switched and packet switched services while E-UTRAN only supports packet switched services.

The UTRAN air interface is Wideband Code Division Multiple Access (WCDMA) based on spread spectrum modulation technology while E-UTRAN employs a multi-carrier modulation scheme called Orthogonal Frequency Division Multiple Access (OFDMA). High Speed Packet Access (HSPA) is a set of protocols that extend and improve the performance of existing 3G UMTS networks using the WCDMA protocol.

In 3G UMTS, the RAN is based on two types of nodes: the access node or base station, called NodeB, and the Radio Network Controller (RNC). The RNC is the node controlling the RAN, and it also connects the RAN to the Core Network (CN).

FIG. 1 is a schematic diagram illustrating a simplified overview of the core network for UMTS. The core network for UMTS includes:

the Circuit-Switched (CS) domain with the Mobile Switching Center (MSC) for connection to the Public Switched Telephone Network (PSTN); and the Packet-Switched (PS) domain with the Serving GPRS Support Node (SGSN) for connection to the RAN, and the Gateway GPRS Support Node (GGSN) for connection to external networks, such as the Internet.

Common for the two domains is the Home Location Register (HLR), a database in the home operator's network that keeps track of the subscribers of the operator.

A key design philosophy of the LTE RAN is to use only one type of node, the evolved Node B, also referred to as eNodeB or eNB. A key concept of the LTE CN is to be independent of the radio access technology to the extent possible. The LTE RAN functions usually involve:

Coding, interleaving, modulation and other typical physical layer functions;

Automatic Repeat reQuest (ARQ) header compression and other typical link layer functions;

User Plane (UP) security functions, e.g., ciphering, and RAN signaling security, e.g., ciphering and integrity protection of RAN originated signaling to the User Equipment (UE); and Radio Resource Management (RRM), handover, and other typical radio resource control functions.

The LTE CN functions usually involve:

Non-Access Stratum (NAS) security functions, e.g., ciphering and integrity protection of CN signaling to the UE;

Subscriber management;

Mobility management;

Bearer management and Quality of Service (QoS) handling;

Policy control and user data flows; and

Interconnection to external networks.

The evolution and standardization of the LTE CN was called the System Architecture Evolution (SAE) and the core network defined in SAE differs radically from the older generation core network and was therefore named the Evolved Packet Core (EPC).

FIG. 2 is a schematic diagram illustrating a simplified overview of the EPC architecture. The basic nodes of the EPC include:

the Mobility Management Entity (MME), which is the control plane node of the EPC;

the Serving Gateway (SG), which is the user plane node connecting the EPC to the LTE RAN; and the Packet Data Network (PDN) Gateway, which is the user plane node connecting the EPC to the Internet.

The MME is normally also connected to a Home Subscriber Server (HSS), which is a database node corresponding to the HLR.

The Serving Gateway and the PDN Gateway may be configured as a single entity.

Sometimes the EPC together with the LTE RAN is denoted Evolved Packet System (EPS).

Currently, the future generation of wireless communications, commonly referred to as Next Generation (NextGen or NG), Next Generation System (NGS) or 5G, is being developed all over the world, although no common 5G standard has yet been set.

The vision of Next Generation wireless communications lies in providing very high data rates, extremely low latency, manifold increase in base station capacity, and significant improvements of user perceived QoS, compared to current 4G LTE networks.

3GPP SA2 has agreed on the non-roaming architecture in 3GPP TR 23.799 V14.0.0, which is illustrated in FIG. 3.

The Access and Mobility management Function (AMF), sometimes referred to as the Mobility Management Function (MMF), Core Network Mobility Management (CN-MM) or simply Mobility Management (MM), is the core network node that supports mobility management and is, thus, playing a similar role to the MME in EPC. AMF has a so-called NG2 interface to RAN that corresponds to the so-called S1 interface between MME and RAN in EPC.

Handover between 3G and 4G wireless communications systems, i.e., between UMTS and EPS/LTE or between UTRAN and E-UTRAN, is today supported in legacy 3GPP systems. In such interworking handover, NAS and Access Stratum (AS) security are activated before the handover can take place. Accordingly, the source wireless communication system in the handover sends a key set to the target wireless communication system in the handover.

In the case of handover from 3G to 4G, i.e., from UMTS or UTRAN to EPS/LTE or E-UTRAN, confidentiality and integrity keys used in the source UMTS system are transferred to the target EPS/LTE system, where they are used to derive NAS and AS keys. The target EPS/LTE system thereby has knowledge of the confidentiality and integrity keys used in the source UMTS system. Accordingly, there is no backward security.

In handover from 4G to 3G, i.e., from EPS/LTE or E-UTRAN to UMTS or UTRAN, the security keys used in the source EPS/LTE system are not transferred to the target UMTS system. In clear contrast, new confidentiality and integrity keys are generated and sent to the target UMTS system. This generation of new confidentiality and integrity keys provide 1 hop backward security.

There are currently development of the signaling involved in handover from the NGS to the EPS/LTE. In this context, the mobility management entity of the NGS, i.e., the AMF, should send security parameters to the corresponding mobility management entity of the EPS/LTE, i.e., the MME. In order to minimize impact on existing nodes, the target MME interprets the received signaling message from the source AMF as sent from a legacy MME. This means that the source AMF needs to act accordingly and provide the necessary security parameters in a similar manner to how this is done between MMEs in the EPC.

However, there is currently no efficient solution of achieving security in handover interworking from NGS to EPS/LTE. NAS and AS security should be activated before the handover from NGS to EPS/LTE can take place. Consequently, the source NGS needs, according to the prior art, to send the required security parameters to the target EPS/LTE during handover. However, such an approach does not achieve any backward security.

SUMMARY

It is a general objective to enable security in connection with handover of a user equipment from a source wireless communication system to a target wireless communication system of different generations.

This and other objectives are met by embodiments as disclosed herein.

An aspect of the embodiments relates to a key management method in connection with handover of a user equipment from a source wireless communication system to a target wireless communication system. The method comprises deriving a first 4G-master key based on a 5G key available at a core network of a source 5G wireless communication system and a 5G-freshness parameter. The method also comprises forwarding the first 4G-master key to a core network of a target 4G wireless communication system for enabling deriving a second 4G-master key based on the first 4G-master key and a 4G-freshness parameter. The method further comprises forwarding the 5G-freshness parameter to the user equipment for enabling deriving the first 4G-master key based on the 5G key and the 5G-freshness parameter and deriving the second 4G-master key based on the first 4G-master key and the 4G-freshness parameter.

Another aspect of the embodiments relates to a key management method in connection with handover of a user equipment from a source wireless communication system to a target wireless communication system. The method comprises receiving, at a core network of a target 4G wireless communication system and from a core network of a source 5G wireless communication system, a first 4G-master key derived based on i) a 5G key available at the core network of the source 5G wireless communication system and the user equipment, and ii) a 5G-freshness parameter. The method also comprises deriving a second 4G-master key based on the first 4G-master key and a 4G-freshness parameter.

A further aspect of the embodiments relates to a key management method in connection with handover of a user equipment from a source wireless communication system to a target wireless communication system. The method comprises deriving a first 4G-master key based on a 5G key available at the user equipment and a core network of a source 5G wireless communication system and a 5G-freshness parameter originating from the core network of the source 5G wireless communication system. The method also comprises deriving a second 4G-master key based on the first 4G-master key and a 4G-freshness parameter available at a core network of a target 4G wireless communication system.

An aspect of the embodiments relates to a key management arrangement configured to derive a first 4G-master key based on i) a 5G key available at a core network of a source 5G wireless communication system and a user equipment to be handed over from the source 5G wireless communication system to a target 4G wireless communication system, and ii) a 5G-freshness parameter. The key management arrangement is also configured to forward the first 4G-master key to a core network of the target 4G wireless communication system for enabling deriving a second 4G-master key based on the first 4G-master key and a 4G-freshness parameter. The key management arrangement is further configured to forward the 5G-freshness parameter to the user equipment for enabling deriving the first 4G-master key based on the 5G key and the 5G-freshness parameter and deriving the second 4G-master key based on the first 4G-master key and the 4G-freshness parameter.

Another aspect of the embodiments relates to a key management arrangement configured to receive, from a core network of a source 5G wireless communication system, a first 4G-master key derived based on i) a 5G key available at the core network of the source 5G wireless communication system and a user equipment to be handed over from the source 5G wireless communication system to a target 4G wireless communication system, and ii) a 5G-freshness parameter. The key management arrangement is also configured to derive a second 4G-master key based on the first 4G-master key and a 4G-freshness parameter.

A further aspect of the embodiments relates to a key management arrangement configured to derive a first 4G-master key based on i) a 5G key available at a user equipment to be handed over from a source 5G wireless communication system to a target 4G wireless communication system and a core network of the source 5G wireless communication system, and ii) a 5G-freshness parameter originating from the core network of the source 5G wireless communication system. The key management arrangement is also configured to derive a second 4G-master key based on the first 4G-master key and a 4G-freshness parameter available at a core network of the target 4G wireless communication system.

An aspect of the embodiments relates to a computer program comprising instructions, which when executed by at least one processor, cause the at least one processor to derive a first 4G-master key based on i) a 5G key available at a core network of a source 5G wireless communication system and a user equipment to be handed over from the source 5G wireless communication system to a target 4G wireless communication system, and ii) a 5G-freshness parameter.

Another aspect of the embodiments relates to a computer program comprising instructions, which when executed by at least one processor, cause the at least one processor to derive a second 4G-master key based on a 4G-freshness parameter and a first 4G-master key originating from a core network of a source 5G wireless communication system and derived based on a i) 5G key available at the core network of the source 5G wireless communication system and a user equipment to be handed over from the source 5G wireless communication system to a target 4G wireless communication system, and ii) a 5G-freshness parameter.

A further aspect for the embodiments relates to a computer program comprising instructions, which when executed by at least one processor, cause the at least one processor to derive a first 4G-master key based on i) a 5G key available at a user equipment to be handed over from a source 5G wireless communication system to a target 4G wireless communication system and a core network of the source 5G wireless communication system, and ii) a 5G-freshness parameter originating from the core network of the source 5G wireless communication system. The at least one processor is also caused to derive a second 4G-master key based on the first 4G-master key and a 4G-freshness parameter available at a core network of the target 4G wireless communication system.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

A key management is provided that enables security activation before handing over a user equipment from a source 5G wireless communication system, e.g., NGS, to a target 4G wireless communication system, e.g., EPS/LTE. The key management achieves backward security, i.e., prevents the target 4G wireless communication system from getting knowledge of 5G security information used in the source 5G wireless communication system.

BRIEF DESCRIPTION OF THE DRAWINGS

The embodiments, together with further objects and advantages thereof, may best be understood by making reference to the following description taken together with the accompanying drawings, in which:

FIG. 15 is a schematic block diagram of a key management arrangement according to yet another embodiment;

FIG. 16 is a schematic block diagram of a key management arrangement according to a further embodiment;

FIG. 17 is a schematic block diagram of a key management arrangement according to another embodiment.

DETAILED DESCRIPTION

The present embodiments generally relate to security management, and in particular to key management in connection with handover between different generations of wireless communication systems.

Figure 1:
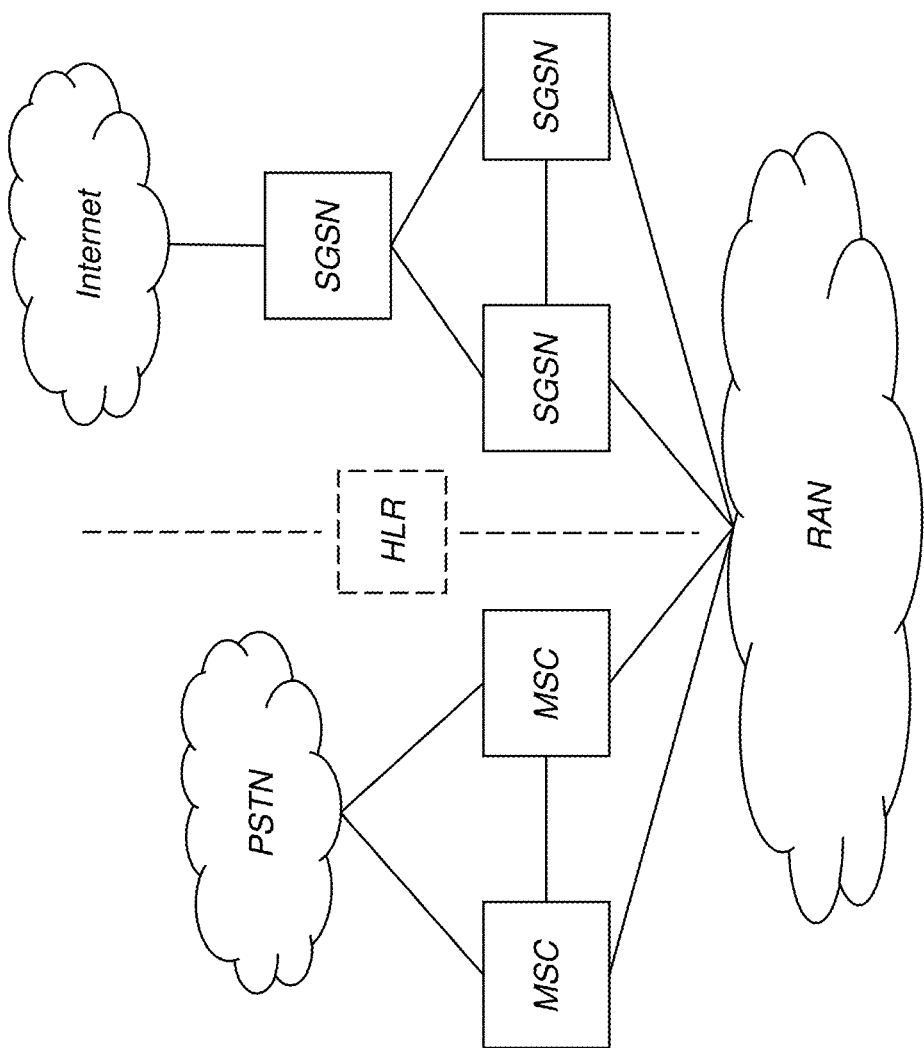
FIG. 1 is a schematic diagram illustrating a simplified overview of the core network for UMTS.
Figure 2:
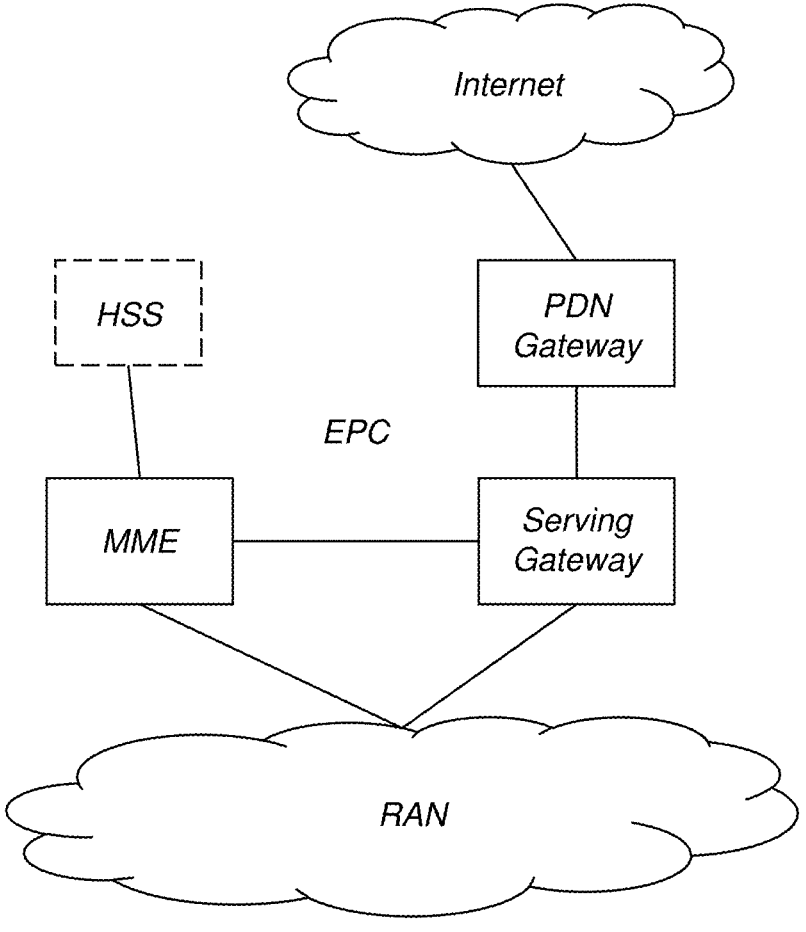
FIG. 2 is a schematic diagram illustrating a simplified overview of the EPC architecture.
Figure 3:
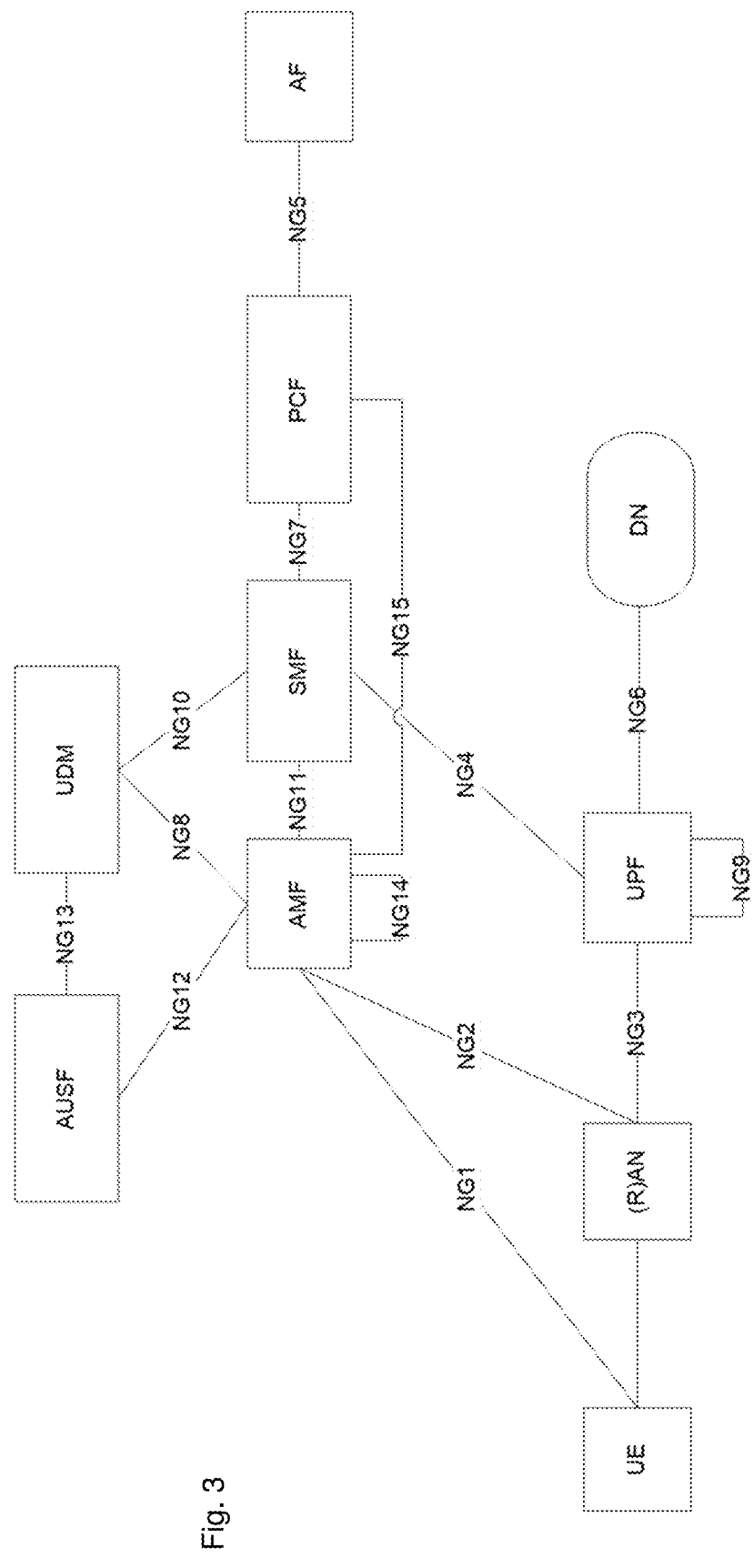
FIG. 3 is a schematic diagram illustrating the non-roaming architecture of NGS.
Figure 4:
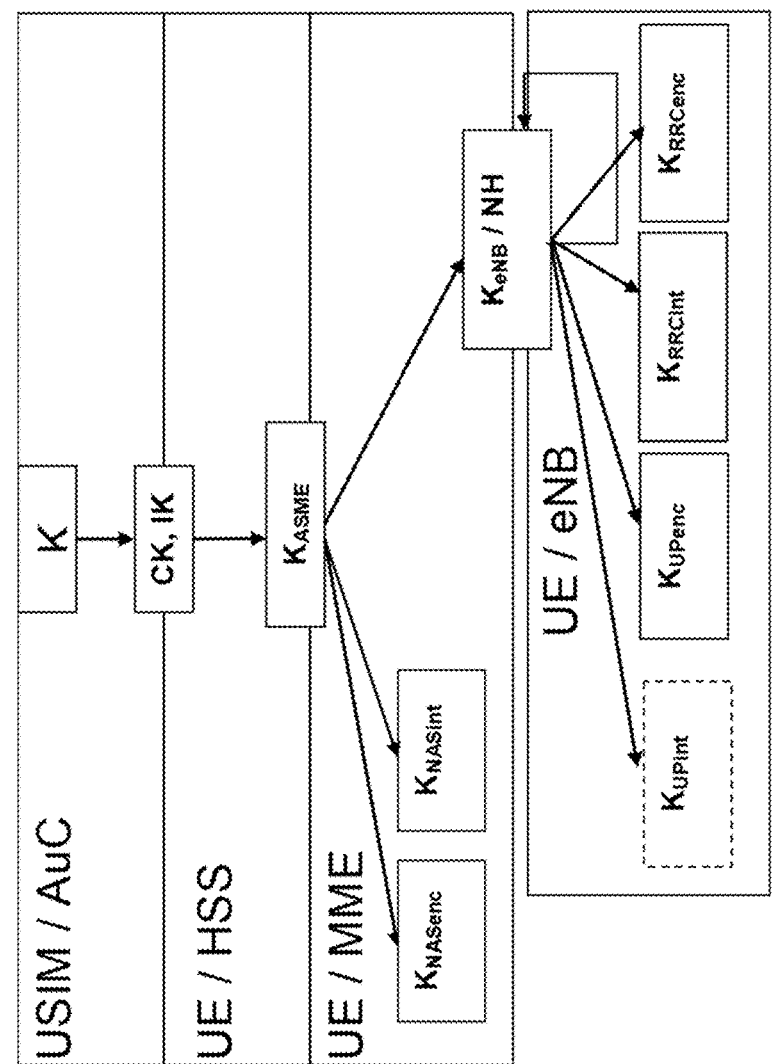
FIG. 4 is a schematic diagram illustrating the EPS/LTE key hierarchy.
Figure 5:
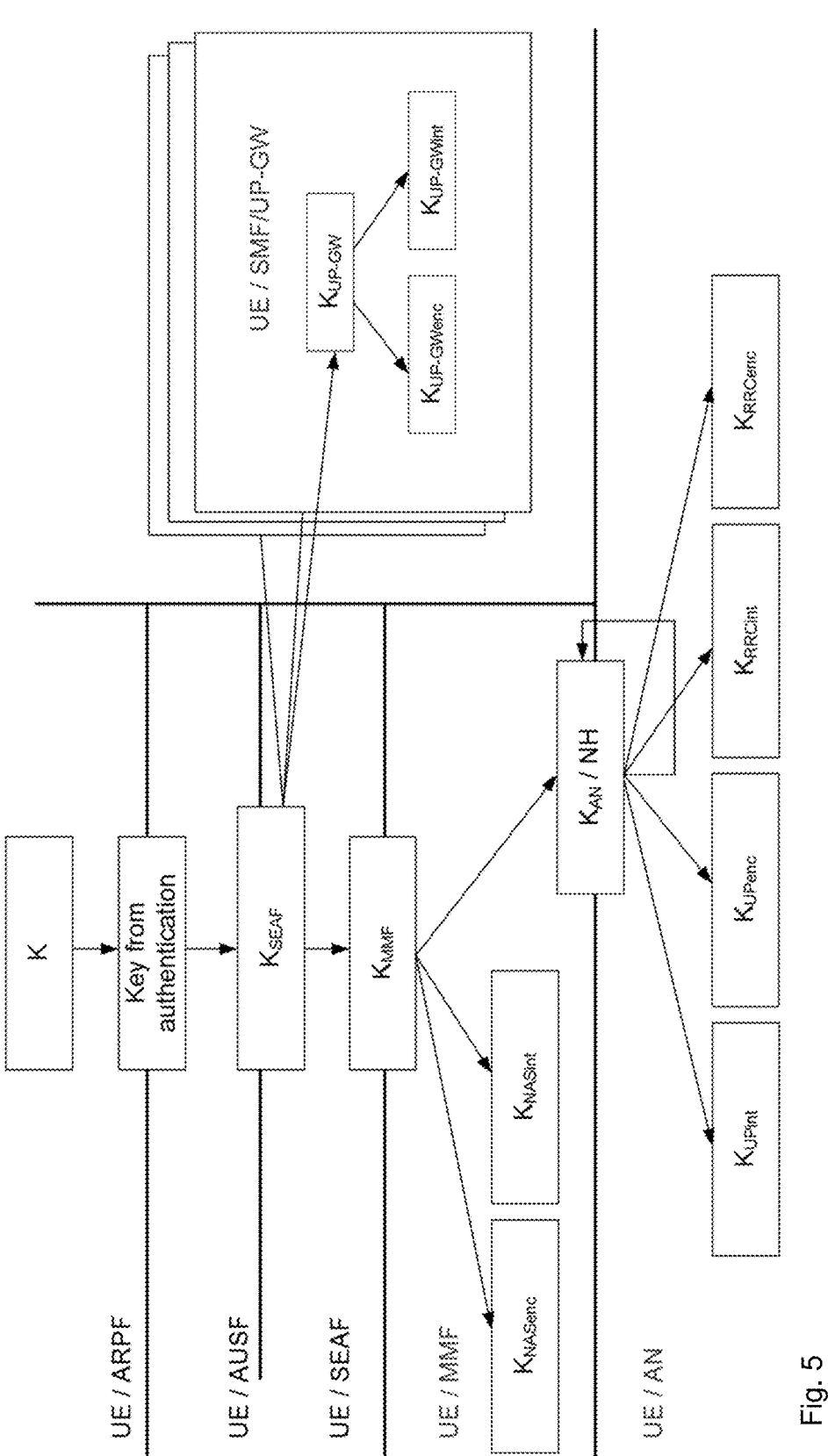
FIG. 5 is a schematic diagram illustrating the NGS key hierarchy.

Prior to describing the handover procedure between 3G and 4G and from the 5G to 4G in some more detail, overviews of the key hierarchy for EPS/LTE and NGS are first described herein with reference to FIGS. 4 and 5.

FIG. 4 schematically illustrates the EPS/LTE key hierarchy. The key hierarchy includes $K_{eNB}$, which is a key derived by the Mobile Equipment (ME) in the UE and the MME from $K_{ASME}$ or by the ME and target eNB. NH is a key derived by ME and MME to provide forward security.

NAS protection uses two keys $K_{NASint}$ and $K_{NASenc}$. $K_{NASint}$ is used for protection of NAS traffic with a particular integrity algorithm, whereas $K_{NASenc}$ is correspondingly used for the protection of NAS traffic with a particular encryption algorithm. These keys are derived by the UE and the MME from $K_{ASME}$ and an identifier for the integrity algorithm or the encryption algorithm, respectively, using a Key Derivation Function (KDF).

Keys for User Plane (UP) traffic, $K_{UPenc}$, $K_{UPint}$, and Radio Resource Control (RRC) traffic, $K_{RRCenc}$, $K_{RRCint}$, are derived by the UE and the eNB from $K_{eNB}$.

The figure also indicates a confidentiality key (CK) and an integrity key (IK) available at the UE and a HSS, and the subscription credential (K) stored at the Universal Subscriber Identity Module (USIM) and Authentication Center (AuC). More information of the EPS key hierarchy can be found in section 6.2 of 3GPP TS 33.401 V14.1.0.

FIG. 5 illustrates a corresponding key hierarchy for the NGS. In general, the key hierarchy is similar to that of EPS/LTE shown in FIG. 4 but with some differences. For instance, an additional layer of key hierarchy is introduced that allows a key resulting from the authentication to be held in a secure location. This in effect corresponds to splitting the key $K_{ASME}$ into the keys $K_{SEAF}$ and $K_{MMF}$. In FIG. 5, K represents the subscription credential that is held in the UE and Authentication Credential Repository and Processing Function (ARPF)/Authentication, Authorization, and Accounting (AAA) server. $K_{SEAF}$ is an anchor key for the authentication session from which subsequent keys, e.g., CN control plane keys and Access Network (AN) keys, are derived. $K_{MMF}$ is a control plane key bound to MMF, which represents the core network entity that terminates the NAS Mobility Management (MM) signaling. The MMF and $K_{MMF}$ are also referred to as AMF and $K_{AMF}$, CN-MM and $K_{CN-MM}$, or CN and $K_{CN}$ in the art.

NAS encryption and integrity protection keys, $K_{NASenc}$ and $K_{NASint}$, are derived from $K_{MMF}$. $K_{MMF}$ may also be used to derive the AN level keys, such as $K_{UPenc}$, $K_{UPint}$, $K_{RRCenc}$, $K_{RRCint}$, using $K_{AN}$, which is the key provided to the AN and corresponds to $K_{eNB}$ in EPS/LTE.

$K_{UP-GW}$, also referred to as $K_{CN-SM/UP}$, is a user plane key for an UP-Gateway (GW) when the user plane security terminates at the UP-GW. More information of the NextGen key hierarchy can be found in section 5.1.4.6.2.2 of 3GPP TS 33.899 V0.6.0.

Figure 6:
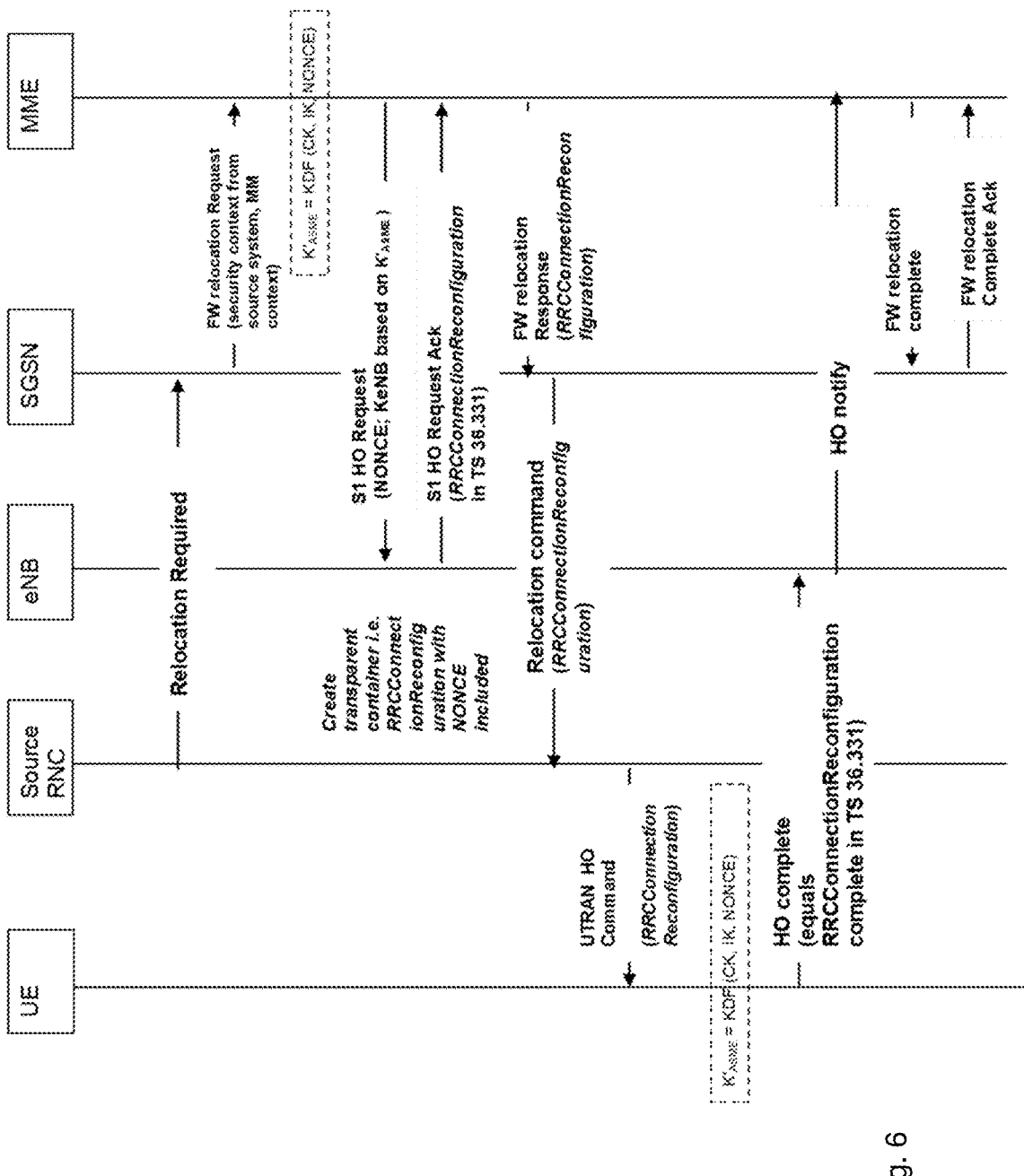
FIG. 6 illustrates the signaling flow during handover from UMTS to EPS/LTE.

FIG. 6 illustrates the signaling involved in the handover from 3G to 4G, i.e., from UMTS or UTRAN to EPS/LTE or E-UTRAN. Generally, at such a handover, the NAS and AS security should be activated in the E-UTRAN. The source system in the handover should always send a key set to the target wireless communication system during handover.

Briefly, the source RNC decides that the UE should be handed over to the EPS/LTE system. The source RNC notifies the source SGSN that handover or relocation is required. The SGSN transfers MM context, including confidentiality key (CK), and an integrity key (IK), Key Set Identifier (KSI) and the UE security capabilities to the target MME in a Forward (FW) relocation request message.

The MME creates a NONCE$_{MME}$ and derives K'$_{ASME}$ from CK, IK and NONCE$_{MME}$ using a one-way KDF. The MME also derives $K_{eNB}$ from K'$_{ASME}$ using a KDF. The MME selects NAS security algorithms, derives NAS keys from K'$_{ASME}$ and includes KSI$_{SGSN}$, NONCE$_{MME}$, and the selected NAS security algorithms in a NAS Security Transparent Container IE of a S1 handover (HO) Request message to the target eNB. The MME further includes $K_{eNB}$ and the UE EPS security capabilities in the S1 HO Request message to the target eNB.

The target eNB selects the AS algorithms, creates a transparent container, denoted RRCConnectionReconfiguration, including the NAS Security Transparent Container IE, and sends it in a S1 HO Request Ack message towards the MME. The eNB derives $K_{RRC}$ and $K_{UP}$ keys from $K_{eNB}$. The MME includes the transparent container received from the target eNB in a FW Relocation Response message sent to SGSN, which includes the transparent container in a relocation command sent to the source RNC. The RNC includes the transparent container in a UTRAN HO command sent to the UE.

The UE derives K'$_{ASME}$, associates it with KSI$_{SGSN}$ and derives $K_{eNB}$ in the same way as the MME above. The UE also derives the NAS key as the MME did above and the RRC and UP keys as the eNB did above. The UE sends an RRCConnectionReconfiguration Complete messages to the eNB, which sends a HO notify to the MME. The MME and SGSN conclude with transmission of FW relocation complete and FW relocation complete Ack messages.

Thus, the source SGSN transfers the CK and IK keys used in the UMTS system to the target MME. The target MME derives a new K'$_{asme}$ from CK, IK and NONCE$_{MME}$. There is no backward security in this case since the target MME has knowledge of the CK and IK keys used in the UMTS system. The target MME uses the new K'$_{asme}$ and derives NAS keys and AS keys therefrom. The NAS keys and AS keys are used in MME and eNB until a new re-authentication takes place in NAS layer in MME.

Figure 7:
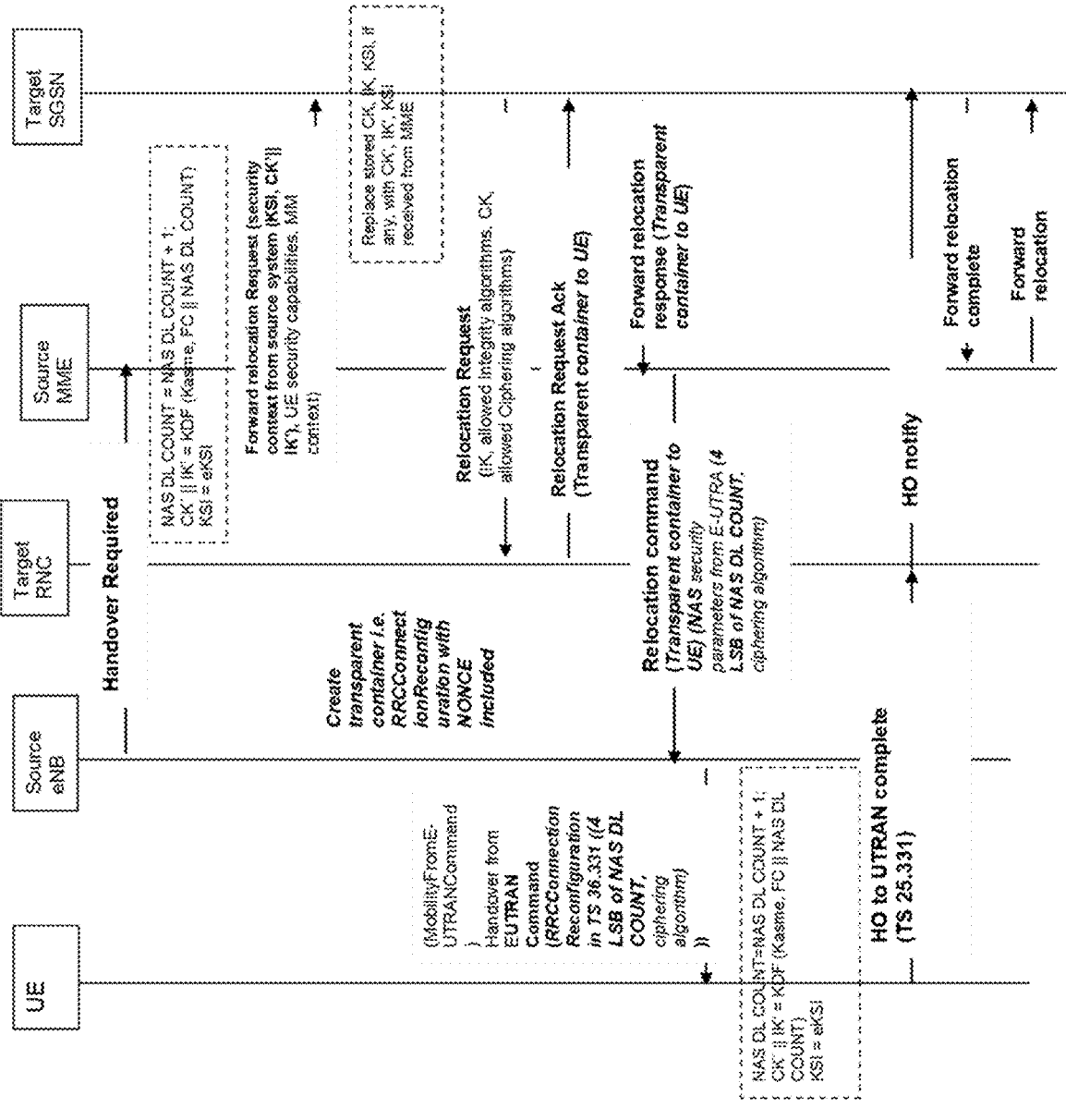
FIG. 7 illustrates the signaling flow during handover from EPS/LTE to UMTS.

FIG. 7 discloses the corresponding signaling taking place in a handover from 4G to 3G, i.e., from EPS/LTE or E-UTRAN to UMTS or UTRAN. Briefly, the source eNB decides that the UE should be handed over to the UMTS system. The source eNB notifies the source MME that handover is required. The source MME selects a current NAS downlink COUNT value to use in the handover and then increases the NAS downlink COUNT value by 1. The source MME and the UE derive a confidentiality key (CK'), and an integrity key (IK') from $K_{ASME}$ and the selected NAS downlink COUNT value of the current EPS key security context with the help of a one-way KDF. The source MME and the UE also assign the value of evolved KSI (eKSI) to the KSI. The source MME transfers MM context, including a concatenation of CK' and IK' (CK'||IK'), KSI and UE security credentials to the target SGSN. The target SGSN replaces all stored parameters CK, IK, KSI, if any, with CK', IK', KSI received from the source MME. The UE correspondingly replaces all stored parameters CK, IK, KSI, if any, with CK', IK', KSI in the ME and USIM. The UE gets access to the NAS downlink COUNT value through the Forward relocation response from the target SGSN to the source MME, the Relocation command from the source MME to the source eNB and the handover command from the eNB to the UE. The target SGSN and target RNC also communicate a relocation request and a relocation request ack between each other. More information of the signaling can be found in section 9.2.2.1 of 3GPP TS 33.401 V14.1.0.

In this case, the source MME does not transfer $K_{asme}$ or any other security key used in source EPS/LTE system to the target SGSN. Source MME derives a new CK' and a new IK', which it provides to the target SGSN. CK' and IK' provide 1 hop backward security. The target SGSN has no knowledge of $K_{asme}$ used in the source EPS/LTE system. The target SGSN uses the received CK' and IK' without performing any further key derivation. CK' and IK' are used in UMTS (target RNC) until a new re-authentication takes place in NAS layer in UTRAN. The source MME knows the CK' and IK' used in target RNC and in further RNC's at handovers in UTRAN.

Figure 8:
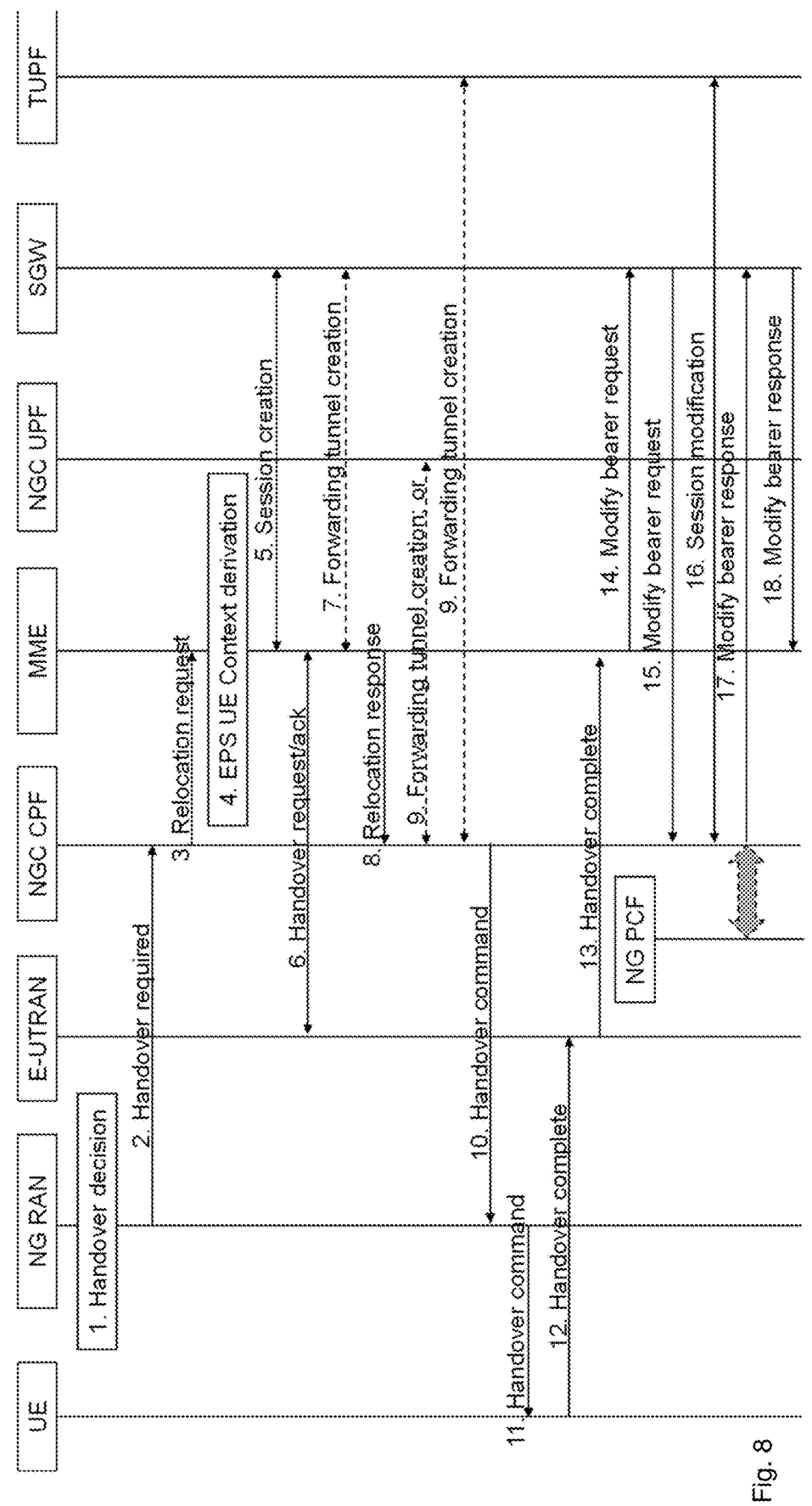
FIG. 8 illustrates the signaling flow during handover from NGS to EPS/LTE.

FIG. 8 is the corresponding proposal for signaling flow for handover from 5G to 4G, i.e., from NGS to EPS/LTE, in 3GPP TR 23.799 V14.0.0. Briefly, the NG RAN decides (1) that the UE should be handed over to the E-UTRAN. The NG RAN notifies (2) the Next Generation Core (NGC) Control Plane Function (CPF), which corresponds to the previously mentioned AMF, that handover is required. The notification message includes Target eNB ID, Source to Target Transparent Container. The NGC CPF selects an MME and sends (3) a Relocation Request (Target eNB ID, Source to Target Transparent Container, NGS UE Context) message to the selected MME, which converts (4) the received NGS UE Context into EPS UE Context. The MME sends (5) a Create Session Request (Packet Data Network (PDN) Connection Information, including EPS Bearer Contexts) message to the Serving Gateway (SGW) and the SGW responds (5) to the MME with a Create Session Response (S1 UL Tunneling Information) message. The MME also sends (6) a Handover Request (Source to Target Transparent Container, E-RAB Contexts, including S1 UL Tunneling Information) message to the E-UTRAN. The E-UTRAN sends (6) a Handover Request Acknowledge (Target to Source Transparent Container, S1 DL Tunneling Information for PDU Forwarding) message to the MME.

If the E-UTRAN provided S1 DL Tunneling Information for PDU Forwarding, the MME requests (7) forwarding tunnel creation to the SGW. The SGW responds (7) to the forwarding tunnel creation request including SGW-side NGy Tunneling Information for PDU Forwarding.

The MME sends (8) a response message to the Relocation Request message as sent according to (3) above. The response message includes the Target to Source Transparent Container and may include the SGW-side NGy Tunneling Information for PDU Forwarding.

If the Relocation Response message includes the SGW-side NGy Tunneling Information for PDU Forwarding, the NGC CPF requests (9) forwarding tunnel creation towards the NGC User Plane Function (UPF), either Terminating UPF (TUPF) or non-terminating NGC UPF if available. The request message includes the SGW-side NGy Tunneling Information for PDU Forwarding. The NGC UPF responds (9) to the NGC CPF with the NG3 UL Tunneling Information for PDU Forwarding.

The NGC CPF sends (10) a Handover Command (Target to Source Transparent Container, NG3 UL Tunneling Information for PDU Forwarding) message to the NG RAN, which commands (11) the UE to handover to the E-UTRAN. The UE detaches from the NG RAN and synchronizes to the E-UTRAN. The NG RAN forwards PDUs coming from the NGC UPF to the NGC UPF using the NG3 UL Tunneling Information for PDU Forwarding, the NGC UPF forwards the PDUs to the SGW using the SGW-side NGy Tunneling Information for PDU Forwarding, and the SGW forwards the PDUs to the E-UTRAN using the S1 DL Tunneling Information for PDU Forwarding.

The UE confirms (12) handover to the E-UTRAN. The E-UTRAN notifies (13) to the MME that the UE is handed over to the E-UTRAN. The notification message includes the S1 DL Tunneling Information. The MME sends (14) a Modify Bearer Request (S1 DL Tunneling Information) message to the SGW, which sends (15) a Modify Bearer Request (EPS Bearer Contexts, including NGy DL Tunneling Information) message to the NGC CPF. The NGC CPF requests (16) session modification to the TUPF. The TUPF receives (16) EPS Bearer Contexts including NGy DL Tunneling Information from the NGC CPF. The NGC CPF obtains (16) Per-Bearer NGy UL Tunneling Information from the TUPF. The NGC CPF sends (17) a Modify Bearer Response (Per-Bearer NGy UL Tunneling Information) message to the SGW. The SGW replaces (18) the NGy UL Tunneling Information received in above with the Per-Bearer NGy UL Tunneling Information.

The embodiments involve calculating, in the source core network of the source 5G wireless communication system, i.e., NGS, such as in the AMF, new security keys to be used in interworking handover from the source 5G wireless communication system to a target 4G wireless communication system, i.e., EPS/LTE. The embodiments also enable transfer of the new calculated security keys to the target core network in EPS/LTE, such as to the MME.

"Source" as used herein indicates the wireless communication system, or an entity thereof, to which the user equipment is currently connected, whereas "target" as used herein denotes the wireless communication system, or an entity thereof, that the user equipment will be connected to following completion of a handover. Thus, a handover takes place from the source to the target.

The embodiments are in particular applicable for allowing handover from a source wireless communication system, such as NGS, to a target wireless communication system, such as EPS/LTE, when the user equipment is in a connected state.

There are generally two user equipment states or modes, the idle state or mode and the connected state or mode. When the user equipment does not have any data to send it is said to be in idle state or mode, and when data is being sent or communication is taking place then the user equipment is said to be in connected state or mode.

Handover from the source 5G wireless communication system to the target 4G wireless communication system could be defined as handover from NGS to EPS/LTE. It also possible to define the handover as handover from the source core network to the target core network, i.e., handover from the NGS core network, or NGC or NG CN for short, to EPC; or handover from the source RAN to the target RAN, i.e., handover from the NGS RAN, or NG RAN for short, to EPS/LTE RAN, i.e., E-UTRAN.

In an embodiment, the key derivation and transfer is performed in a way that prevents or prohibits the target core network, e.g., the MME, from getting any knowledge of the security keys used in source core network, e.g., in the AMF. In a particular embodiment, the proposed solutions prohibit the target core network in EPC, e.g., the MME, from getting any knowledge of the security keys used in the source core network in NGS, e.g., the AMF, and also used in the connected base stations or node-B of the NG RAN (gNB) and the LTE eNBs connected to the AMF.

In an embodiment, the at least one new security key sent from the source AMF to target MME provides 1 hop backward security.

Non-limiting, but illustrative, examples of security keys used in the source 5G wireless communication system include keys shown in FIG. 5 discussed in the foregoing. In particular, such 5G security keys that are preferably prevented from being available at the target 4G wireless communication system include $K_{SEAF}$; $K_{MMF}$, also denoted $K_{AMF}$, $K_{CN-MM}$, or $K_{CN}$; $K_{NAS}$ keys, such as $K_{NASenc}$, $K_{NASint}$; and NAS confidentiality and integrity keys (NAS-CK, NAS-IK).

In an embodiment, the solution prevents or prohibits the source core network in NGS, e.g., the AMF, from getting any knowledge of the security keys used in target core network in EPC, e.g. the MME and LTE eNBs connected to the MME. This provides forward security. This embodiment is possible if the so-called 4G-freshness parameter used to derive new security keys in the MME is not sent through the source wireless communication system, such as to the source AMF and source gNB. In clear contrast, the 4G-freshness parameter is known both at the target core network, such as the MME, and the user equipment. Accordingly, there is no need to transfer the 4G-freshness parameter from the MME to the user equipment in this particular embodiment.

The embodiments will now be described in some more detail with reference to particular implementation examples.

In an embodiment, a new key, denoted first 4G-master key or 4G-master key' herein, is derived from a 5G key available at the source core network. In a particular embodiment, the 4G-master key' is derived from the 5G key available at the source core network and a 5G-freshness parameter available, derived or generated at the source core network.

In a particular embodiment, the 4G-master key' is a 256-bit 4G-master key'.

The 5G-freshness parameter could be a random number, a counter value, or an identity as non-limiting, but illustrative, examples. In a particular embodiment, the 5G-freshness parameter is a counter value, such as a NAS COUNT value. In the case of a user equipment in a connected state, the NAS COUNT value is preferably a NAS downlink COUNT value.

In a first implementation example, the 4G-master key' is derived from $K_{CN}$ using the 5G-freshness parameter. For instance, 4G-master key'=f($K_{CN}$, 5G-freshness parameter). In a particular example, 4G-master key'=KDF($K_{CN}$, new FC number||5G-freshness parameter).

In a second implementation example, the 4G-master key' is derived from $K_{CN-MM}$ using the 5G-freshness parameter. For instance, 4G-master key'=f($K_{CN-MM}$, 5G-freshness parameter). In a particular example, 4G-master key'=KDF ($K_{CN-MM}$, new FC number||5G-freshness parameter).

In a third implementation example, the 4G-master key' is derived from $K_{MMF}$ using the 5G-freshness parameter. For instance, 4G-master key'=f($K_{MMF}$, 5G-freshness parameter). In a particular example, 4G-master key'=KDF($K_{MMF}$, new FC number||5G-freshness parameter).

In a fourth implementation example, the 4G-master key' is derived from $K_{AMF}$ using the 5G-freshness parameter. For instance, 4G-master key'=f($K_{AMF}$, 5G-freshness parameter). In a particular example, 4G-master key'=KDF($K_{AMF}$, new FC number||5G-freshness parameter).

In a fifth implementation example, the 4G-master key' is derived from $K_{SEAF}$ using the 5G-freshness parameter. For instance, 4G-master key'=f($K_{SEAF}$, 5G-freshness parameter). In a particular example, 4G-master key'=KDF($K_{SEAF}$, new FC number||5G-freshness parameter).

In an embodiment, the first 4G-master key, such as $K_{ASME}$ $K'_{ASME}$, is derived from the 5G key, such as $K_{AMF}$, and the 5G-freshness parameter, such as a NAS downlink COUNT value.

In an embodiment, the 4G-master key' is derived at the source core network, such as at a core network node or an entity or functionality implemented in the source core network. In a particular embodiment, the 4G-master key' is derived by an entity or functionality of the source core network managing mobility within the source wireless communication network. This entity or functionality is preferably the previously mentioned AMF, also referred to as MMF and CN-MM in the art.

In an embodiment, the source core network, such as the entity or functionality managing mobility, e.g., the AMF, forwards or sends the 4G-master key' to the target core network, and preferably to an entity or functionality in the target core network managing mobility within the target wireless communication network. This entity or functionality is preferably the previously mentioned MME.

In an embodiment, the source core network, such as the entity or functionality managing mobility in the source core network, e.g., the AMF, should not expose the 5G-freshness parameter to the target core network, such as the entity or functionality managing mobility in the target core network, e.g., the MME.

In an embodiment, the source core network, such as the entity or functionality managing mobility, e.g., the AMF, forwards or sends the 5G-freshness parameter to the user equipment. This transmission of the 5G-freshness parameter to the user equipment preferably involves the source RAN, such as gNB of the source RAN. In such a case, the 5G-freshness parameter is not exposed to the target wireless communication system.

In an embodiment, a new key, denoted second 4G-master key or 4G-master key" herein, is derived from the 4G-master key' at the target core network. In a particular embodiment, the 4G-master key" is derived from the received 4G-master key' and a 4G-freshness parameter available, derived or generated at the target core network.

In a particular embodiment, the 4G-master key" is a 256-bit 4G-master key".

The 4G-freshness parameter could be a random number, a counter value, an identity, a static identity, or a static parameter as non-limiting, but illustrative, examples. In a particular embodiment, the 5G-freshness parameter is a counter value, such as a NAS COUNT value, for instance a NAS uplink COUNT value.

In an embodiment, the second 4G-master key, such as KeNB, is derived from the first 4G-master key, such as $K_{ASME}$ $K'_{ASME}$, and the 4G-freshness parameter, such as NAS uplink COUNT value.

In another embodiment, the second 4G-master key, such as $K'_{ASME}$ or $K''_{ASME}$, is derived from the first 4G-master key, such as $K_{ASME}$ $K'_{ASME}$, and the 4G-freshness parameter, such as a counter value.

In an implementation example, the 4G-master key" is derived from the 4G-master key' received from the source core network, such as from the entity or functionality of the source core network managing mobility with the source wireless communication network, e.g., the AMF, using the 4G-freshness parameter. For instance, 4G-master key"=f (4G-master key', 4G-freshness parameter). In a particular example, 4G-master key"=KDF(4G-master key', new FC number||4G-freshness parameter).

In the above presented implementation examples, f(·) is a function that derives a 4G-master key, e.g., 4G-master key' or 4G-master key", based on the input key, e.g., $K_{CN}$, $K_{CN-MM}$, $K_{MMF}$, $K_{AMF}$, $K_{SEAF}$ or 4G-master key', and the freshness parameter, e.g., 5G-freshness parameter or 4G-freshness parameter. KDF denotes a key derivation function, || denotes concatenation, and FC number is preferably a single octet used to distinguish between different instances of the key derivation algorithm.

In an embodiment, the user equipment derives the 4G-master key' from a 5G key available at the user equipment. In a particular embodiment, the 4G-master key' is derived from the 5G key available at the user equipment and the 5G-freshness parameter received or originating from the source core network, such as from the entity or functionality managing mobility within the source wireless communication network, e.g., from the AMF. The user equipment preferably also derives the 4G-master key" from the derived 4G-master key'. In a particular embodiment, the user equipment derives the 4G-master key" from the derived 4G-master key' and the 4G-freshness parameter.

In these embodiments, the 5G key used to derive the 4G-master key' is available both at the source core network, such as in the entity or functionality managing mobility within the source wireless communication network, e.g., the AMF, and at the user equipment, see FIG. 5.

The user equipment can provide or obtain the 4G-freshness parameter according to various embodiments.

In a first embodiment, the 4G-freshness parameter is known by the target core network, such as the entity or functionality managing mobility within the target wireless communication network, e.g., the target MME, and the user equipment. In this embodiment, the 4G-freshness parameter thereby does not have to be sent to the user equipment through the source wireless communication system, i.e., through the source core network, e.g., the source AMF, and the source RAN, e.g., the source gNB. For instance, the 4G-freshness parameter could be some static information, such as static identity or a static parameter, which does not change at further handovers.

In a second embodiment, the target core network, such as the entity or functionality managing mobility within the target wireless communication network, e.g., the target MME, sends or forwards the 4G-freshness parameter to the user equipment. In such a case, the target MME could send the 4G-freshness parameter via the source core network, such as the entity or functionality managing mobility within the source wireless communication network, e.g., the source AMF, and then via the source RAN, such as gNB, to the user equipment. In another case, the 4G-freshness parameter is sent via the target RAN, such as the target eNB, for instance, if the 4G-freshness parameter is included in a transparent container by the target eNB, which is transferred back to the target MME and then further to the source AMF and the source gNB.

Figure 9:
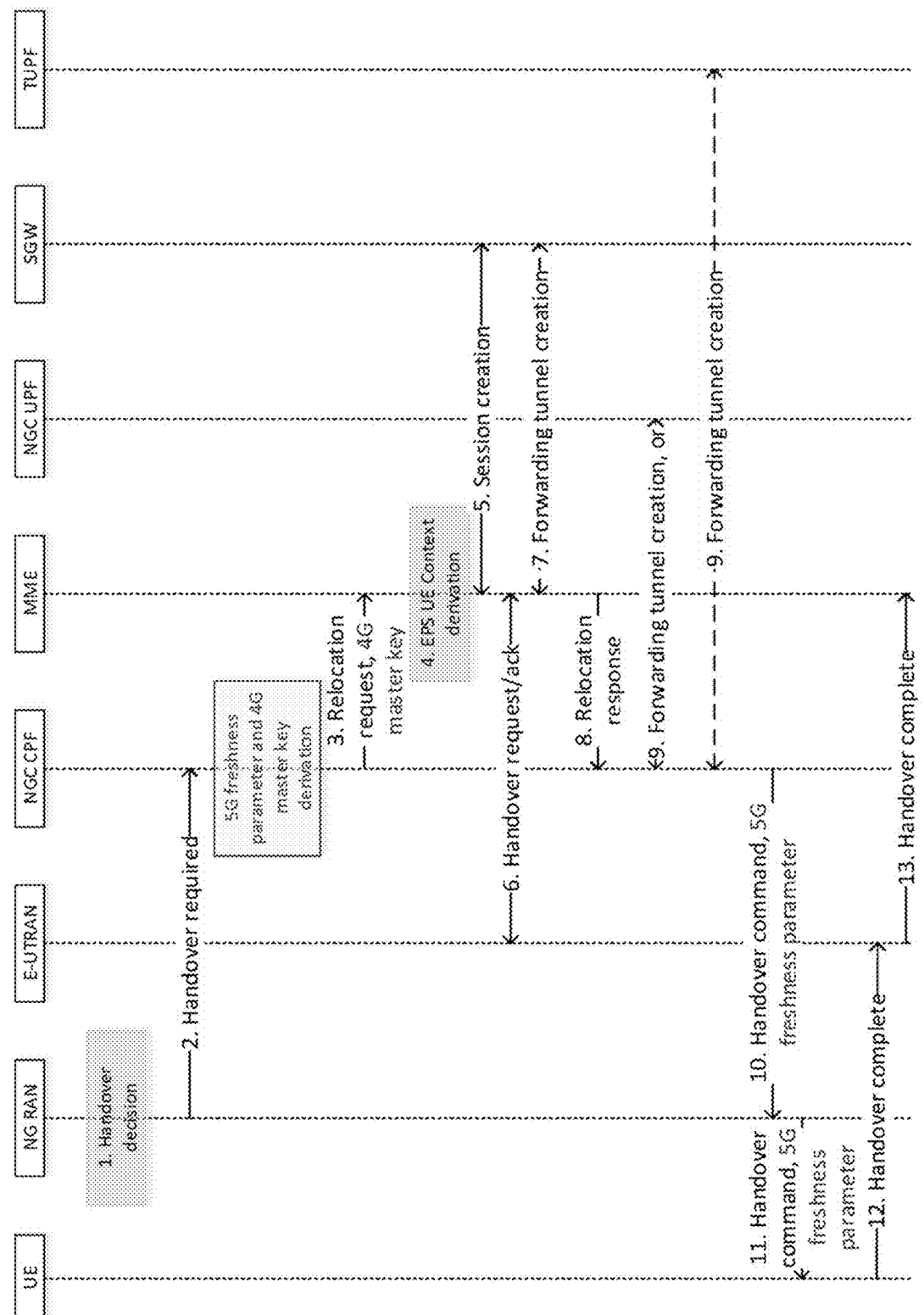
FIG. 9 illustrates the signaling flow during handover from NGS to EPS/LTE including key management operations according to an embodiment.

FIG. 9 illustrates the initial signaling up to handover completed in FIG. 8 together with additional signaling from the AMF.

Thus, in an implementation example, the AMF, represented as NGC CPF in FIG. 9, provides the 5G-freshness parameter and derives, calculates or generates the 4G-master key', preferably based on the reception of the notification message from the NG RAN that a handover is required.

The AMF also sends the 4G-master key' to the target MME. This 4G-master key' is preferably included in a Relocation request sent from the AMF to a target MME selected by the AMF. In such a case, the Relocation Request may include the 4G-master key' in addition to the Target eNB ID, Source to Target Transparent Container, and NGS UE Context. In an alternative embodiment, the 4G-master key' is sent to the target MME in another message separate from the Relocation Request.

The AMF preferably also sends the 5G-freshness parameter to the user equipment. The 5G-freshness parameter is preferably included in a Handover Command sent from the AMF to the NG RAN and further to the user equipment. In such a case, the Handover Command may include the 5G-freshness parameter in addition to the Target to Source Transparent Container and NG3 UL Tunneling Information for PDU Forwarding. In an alternative embodiment, the 5G-freshness parameter is sent to the user equipment in another message separate from the Handover Command.

Figure 10:
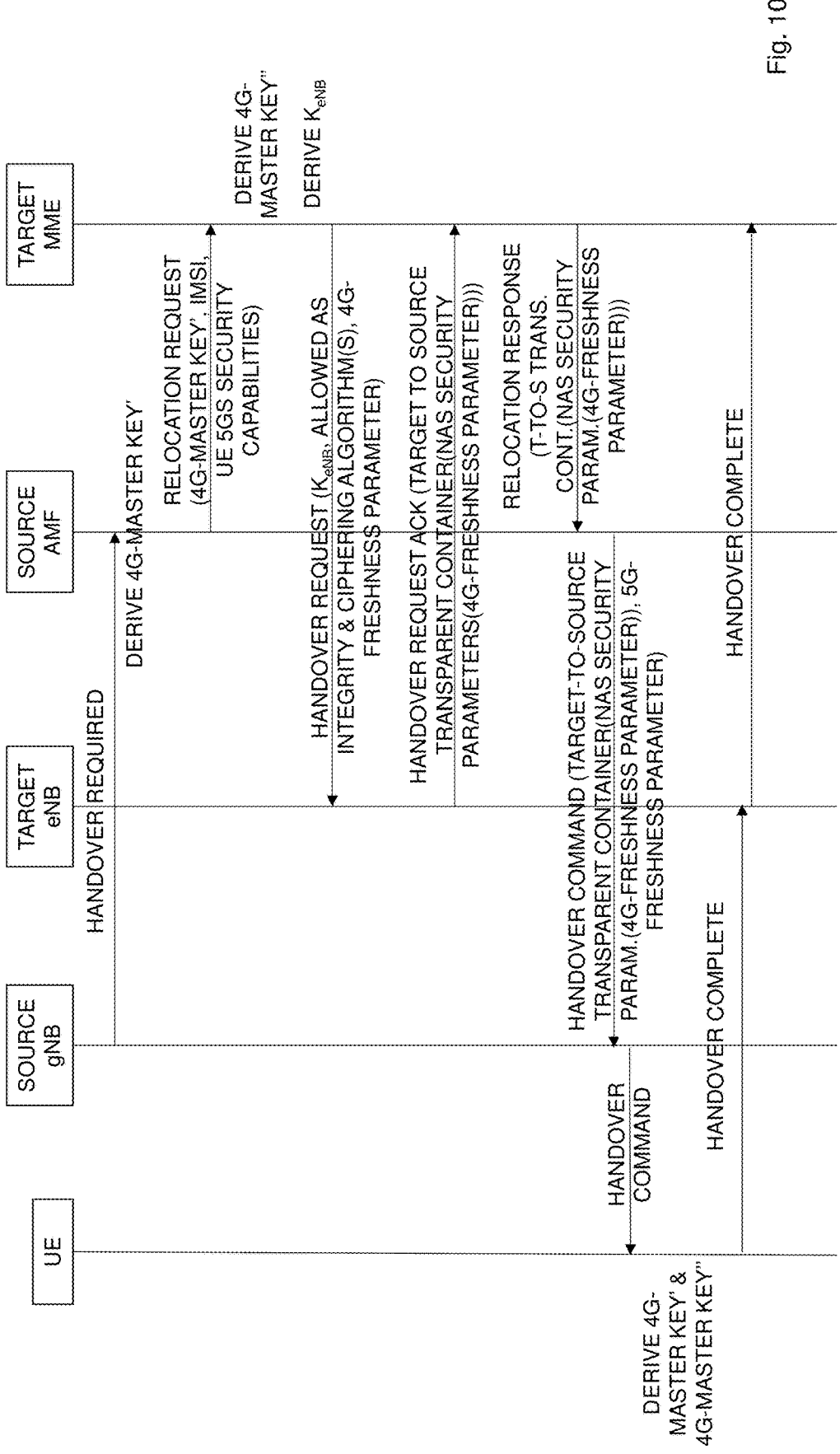
FIG. 10 illustrates the signaling flow during handover from NGS to EPS/LTE including key management operations according to another embodiment.

FIG. 10 illustrates signaling flow for handover from NGS to the EPS/LTE according to an embodiment involving transmitting the 4G-freshness parameter from the target MME to the user equipment.

The NG RAN, represented by a source gNB in the figure, decides that the UE should be handed over to the EPS/LTE and E-UTRAN. The NG RAN notifies the NGC CPF, represented by source AMF in the figure, that handover is required. The source AMF derives a new 4G-master key' from a 5G key, such as from $K_{CN}$, $K_{CN-MM}$, $K_{MMF}$, $K_{AMF}$ or $K_{SEAF}$, using a 5G-freshness parameter. The AMF selects a target MME and sends a Relocation Request including the 4G-master key' and UE 5GS Security Capabilities to the MME. The Relocation Request typically also comprises the International Mobile Subscriber Identity (IMSI) that are used to identify the relevant UE.

The target MME derives a new 4G-master key" from the 4G-master key' received from the source AMF using a 4G-freshness parameter. The target MME also derives $K_{eNB}$ from the 4G-master key". In another embodiment, the 4G-master key" is $K_{eNB}$. The target MME sends a Handover Request to the E-UTRAN, represented by a target eNB in the figure. The Handover Request comprises $K_{eNB}$ and the 4G-freshness parameter. The Handover Request typically also comprises information of allowed AS integrity and ciphering algorithm(s). In an embodiment, the 4G-freshness parameter is included in a NAS security container, which is transparent to the target RAN, i.e., E-UTRAN. The target eNB sends a Handover Request Ack to the target MME. This Handover Request Ack comprises a Target to Source Transparent Container with NAS security parameters including the 4G-freshness parameter. Thus, the Target to Source Transparent Container preferably comprises the previously received NAS security container.

The target MME sends a Relocation Response message to the source AMF in response to the previously received Relocation Request message. The Relocation Response message comprises the Target to Source Transparent Container with NAS security parameters including the 4G-freshness parameter, such as in the NAS security container. The source AMF sends a Handover Command to the source gNB. The Handover Command comprises the Target to Source Transparent Container with NAS security parameters, including the 4G-freshness parameter, such as in the NAS security container. The Handover Command, such as the Target to Source Transparent Container in the Handover Command, also comprises the 5G-freshness parameter included by the source AMF. The source gNB forwards the Handover Command to the UE. Thus, the Handover Command sent from the source gNB to the UE comprises the 5G-freshness parameter and, in the illustrated embodiment, also the 4G-freshness parameter.

The UE uses the 5G-freshness parameter included in the Handover Command to derive the 4G-master key' based on the 5G key, such as from $K_{CN}$, $K_{CN-MM}$, $K_{MMF}$, $K_{AMF}$ or $K_{SEAF}$. The UE also derives the 4G-master key" from the 4G-master key' using the 4G-freshness parameter received, in this embodiment, in the Handover Command.

The UE may optionally also calculate $K_{eNB}$ from the 4G-master key", or alternatively the 4G-master key" is $K_{eNB}$. In such a case, both the UE and the target eNB have access to a respective copy of the $K_{eNB}$ key.

The UE detaches from the NG RAN and the source gNB and synchronizes to the E-UTRAN and the target eNB. The UE confirms handover to the target eNB by a Handover Complete message. The target eNB notifies the target MME that the UE is handed over to the E-UTRAN and the target eNB by a Handover Complete message.

In a variant of the signaling flow shown in FIG. 10, the 4G-freshness parameter is not included in the Handover Request sent from the target MME to the target eNB. Accordingly, the 4G-freshness parameter is not included in the Handover Request Ack sent by the target eNB in response to the Handover Request.

In another variant of the signaling flow shown in FIG. 10, the 4G-freshness parameter is known to both the target MME and the UE. For instance, the 4G-freshness parameter could be some static information that does not change between different handover occasions. In such a variant, the 4G-freshness parameter is not included in the Handover Request, the Handover Request Ack, the Relocation Response, nor the Handover Command.

In FIG. 10, the NGS RAN has been represented by a NGS Node B, denoted gNB. In NGS, EPS/LTE eNBs might also be connected to the NGS core network, such as to the AMF. In such embodiments, an EPS/LTE eNB replaces the source gNB in FIG. 10.

Hence, in an embodiment, the source AMF in NGS derives a new 4G-master key' from a 5G key, such as $K_{CN}$, $K_{CN-MM}$, $K_{MMF}$, $K_{AMF}$ or $K_{SEAF}$, stored in or otherwise available at the source AMF using a 5G-freshness parameter. The source AMF sends the new 4G-master key' to the target MME in EPS/LTE. The source AMF also sends the 5G-freshness parameter to the UE.

In an embodiment, the target MME derives a new 4G-master key" from the 4G-master key' received from the source AMF using a 4G-freshness parameter. The target MME takes the new 4G-master key" into use and can derive further NAS keys and AS keys from the 4G-master key", such as $K_{NASenc}$, $K_{NASint}$, and/or $K_{eNB}$, see FIG. 4. In addition, $K_{eNB}$ derived from or being the 4G-master key" may, in an embodiment, in turn be used to derive UP keys, such as $K_{UPint}$, $K_{UPenc}$, and/or RRC keys, such as $K_{RRCint}$, $K_{RRCenc}$.

As was mentioned in the foregoing, the UE can get information of the 4G-freshness parameter according to various embodiment. In a first embodiment, the 4G fresh-ness parameter is known to the target MME and the UE, and is not sent through the source wireless communication system, such as through the source AMF and source gNB. The 4G-freshness parameter could be some static informa-tion that does not change at further handovers. In a second embodiment, the target MME sends the 4G freshness param-eter to the UE, optionally via the target eNB and, via the source AMF and then via the source gNB to the UE.

An aspect of the embodiments relates to a key manage-ment method in connection with handover of a user equip-ment from a source wireless communication system to a target wireless communication system. The method com-prises deriving a first 4G-master key, such as 4G-master key', based on i) a 5G key, such as $K_{SEAF}$, $K_{MMF}$, $K_{CN}$, $K_{CN-MM}$ or $K_{AMF}$, available at a core network of a source 5G wireless communication system, such as NGS, and the user equipment, and ii) a 5G-freshness parameter. The method also comprises forwarding the first 4G-master key to a core network of a target 4G wireless communication system, such as EPS/LTE, for enabling deriving a second 4G-master key, such as 4G-master key", based on the first 4G-master key and a 4G-freshness parameter. The method further com-prises forwarding the 5G-freshness parameter to the user equipment for enabling deriving the first 4G-master key based on the 5G key and the 5G-freshness parameter and deriving the second 4G-master key based on the first 4G-master key and the 4G-freshness parameter.

The key management method thereby enables the user equipment to communicate securely with a radio access network of the target 4G wireless communication system using the second 4G-master key or a key, such as $K_{eNB}$, $K_{UPint}$, $K_{UPenc}$, $K_{RRCint}$, and/or $K_{RRCenc}$, derived based on the second 4G-master key and/or communicate securely with a core network of the target 4G wireless communica-tion system using the second 4G-master key or a key, such as $K_{NASint}$ and/or $K_{NASenc}$, derived based on the second 4G-master key.

In an embodiment, the key management method is per-formed in connection with handover of the user equipment in a connected state. In a particular embodiment, the key management method is performed in connection with han-dover of the user equipment in a connected state to the source 5G wireless communication system.

In an embodiment, the method comprises generating the 5G-freshness parameter based on reception of notification message indicating that handover is required.

In a particular embodiment, the notification message is received from a radio access network (RAN) of the source 5G wireless communication system, such as from a source RAN node, such as source gNB, of the source 5G wireless communication system. In an embodiment, the notification message optionally comprises an identifier of a target RAN node, such as target eNB, of the target 4G wireless com-munication system and/or a Source to Target Transparent Container.

In an embodiment, deriving the first 4G-master key com-prises deriving, calculating or generating the first 4G-master key by a key deriving function based on the 5G key and the 5G-freshness parameter. In a particular embodiment, deriv-ing the first 4G-master key comprises deriving, calculating or generating the first 4G-master key by a key deriving function based on the 5G key and a concatenation of a FC number and the 5G-freshness parameter.

In an embodiment, deriving the first 4G-master key com-prises deriving, calculating or generating the first 4G-master key based on $K_{SEAF}$ and the 5G-freshness parameter.

In an embodiment, deriving the first 4G-master key com-prises deriving, calculating or generating the first 4G-master key based on $K_{AMF}$ and the 5G-freshness parameter.

In an embodiment, deriving the first 4G-master key com-prises deriving, calculating or generating the first 4G-master key based on $K_{MMF}$ and the 5G-freshness parameter.

In an embodiment, deriving the first 4G-master key com-prises deriving, calculating or generating the first 4G-master key based on $K_{CN}$ and the 5G-freshness parameter.

In an embodiment, deriving the first 4G-master key com-prises deriving, calculating or generating the first 4G-master key based on $K_{CN-MM}$ and the 5G-freshness parameter.

In an embodiment, deriving the first 4G-master key com-prises deriving, calculating or generating a 256-bit 4G-mas-ter key based on the 5G key and the 5G-freshness parameter.

In an embodiment, deriving the first 4G-master key com-prises a mobility managing entity or functionality of the core network of the source 5G wireless communication system deriving the first 4G-master key based on the 5G key and the 5G-freshness parameter. In a particular embodiment, the mobility managing entity or functionality is AMF or a core network node comprising the mobility managing function-ality.

In a particular embodiment, forwarding the 5G-freshness parameter to the user equipment comprises forwarding the 5G-freshness parameter to the user equipment via the source mobility managing entity or functionality, such as source AMF, of the core network of the source 5G wireless com-munication system.

In another particular embodiment, the method comprises receiving the 5G-freshness parameter from the source mobility managing entity or functionality, such as source AMF, of the core network of the source 5G wireless com-munication system.

In a further particular embodiment, deriving the first 4G-master key comprises deriving the first 4G-master key based on the 5G key and the 5G-freshness parameter in response to a key generation request from the source mobil-ity managing entity or functionality, such as source AMF, of the core network of the source 5G wireless communication system.

In an embodiment, forwarding the first 4G-master key to the core network of the target 4G wireless communication system comprises forwarding the first 4G-master key to a target mobility managing entity or functionality, such as target MME, of the core network of the target 4G wireless communication system.

In a particular embodiment, forwarding the first 4G-mas-ter key to the core network of the target 4G wireless communication system comprises forwarding a Relocation Request message comprising the first 4G-master key to the core network of the target 4G wireless communication system. The Relocation Request message optionally also comprises an identifier of a target RAN node, such as target eNB, of the target 4G wireless communication system, a Source to Target Transparent Container and/or 5G UE Context, such as 5G UE Security Capabilities.

In an embodiment, forwarding the 5G-freshness parameter to the user equipment comprises forwarding the 5G-freshenss parameter to the user equipment via a radio access network of the source 5G wireless communication system, such as via a gNB.

In an embodiment, the method comprises receiving a Relocation Response message comprising the 4G-freshness parameter from the core network of the target 4G wireless communication system. In a particular embodiment, the Relocation Response message also optionally comprises the Target to Source Transparent Container.

In an embodiment, forwarding the 5G-freshness parameter to the user equipment comprises forwarding a Handover Command comprising the 5G-freshness parameter to the user equipment. In a particular embodiment, the Handover Command optionally comprises the 4G-freshness parameter. In an alternative or additional particular embodiment, the Handover Command optionally comprises a Target to Source Transparent Container, NG3 UL Tunneling Information for PD Forwarding and/or NAS security parameters.

The above described embodiments are preferably performed in a key and/or mobility managing entity or functionality of the core network of the source 5G wireless communication system, such as in a core network node comprising such a key and/or mobility managing entity or functionality, e.g., the AMF or a core network node comprising the AMF.

Another aspect of the embodiments relates to a key management method in connection with handover of a user equipment from a source wireless communication system to a target wireless communication system. The method comprises receiving, at a core network of a target 4G wireless communication system, such as EPS/LTE, and from a core network of a source 5G wireless communication system, such as NGS, a first 4G-master key, such as 4G-master key', derived based on i) a 5G key, such as $K_{SEAF}$, $K_{MMF}$, $K_{CN}$, $K_{CN-MM}$ or $K_{AMF}$, available at the core network of the source 5G wireless communication system and the user equipment, and ii) a 5G-freshness parameter. The method also comprises deriving a second 4G-master key, such as 4G-master key'', based on the first 4G-master key and a 4G-freshness parameter.

The key management method thereby enables the user equipment to communicate securely with a radio access network of the target 4G wireless communication system using the second 4G-master key or a key, such as $K_{eNB}$, $K_{UPint}$, $K_{UPenc}$, $K_{RRCint}$, and/or $K_{RRCenc}$, derived based on the second 4G-master key and/or communicate securely with the core network of the target 4G wireless communication system using the second 4G-master key or a key, such as $K_{NASint}$ and/or $K_{NASenc}$, derived based on the second 4G-master key.

In an embodiment, the key management method is performed in connection with handover of the user equipment in a connected state. In a particular embodiment, the key management method is performed in connection with handover of the user equipment in a connected state to the source 5G wireless communication system.

In an embodiment, the method comprises generating the 4G-freshness parameter based on reception of the first 4G-master key.

In an embodiment, deriving the second 4G-master key comprises deriving, calculating or generating a 256-bit 4G-master key based on the first 4G-master key and the 4G-freshness parameter.

In an embodiment, deriving the second 4G-master key comprises deriving, calculating or generating the second 4G-master key by a key deriving function based on the first 4G-master key and the 4G-freshness parameter. In a particular embodiment, deriving the second 4G-master key comprises deriving, calculating or generating the second 4G-master key by a key deriving function based on the first 4G-master key and a concatenation of a FC number and the 4G-freshness parameter.

In an embodiment, deriving the second 4G-master key comprises a mobility managing entity or functionality of the core network of the target 4G wireless communication system deriving the second 4G-master key based on the first 4G-master key and the 4G-freshness parameter. In a particular embodiment, the mobility managing entity or functionality is MME or a core network node comprising the mobility managing functionality.

In an embodiment, receiving the first 4G-master key comprises receiving, from the core network of the source 5G wireless communication system, a Relocation Request message comprising the first 4G-master key. The Relocation Request message optionally also comprises an identifier of a target RAN node, such as target eNB, of the target 4G wireless communication system, a Source to Target Transparent Container and/or 5G UE Context, such as 5G UE Security Capabilities.

In an embodiment, the method also comprises forwarding the second 4G-master key or a key, such as $K_{eNB}$, $K_{UPint}$, $K_{UPenc}$, $K_{RRCint}$, and/or $K_{RRCenc}$, derived from the second 4G-master key, to a radio access network of the target 4G wireless communication system.

In another embodiment, the method comprises forwarding the second 4G-master key or a key, such as $K_{eNB}$, $K_{UPint}$, $K_{UPenc}$, $K_{RRCint}$, and/or $K_{RRCenc}$, derived from the second 4G-master key, and the 4G-freshness parameter to a radio access network of the target 4G wireless communication system.

In a particular embodiment, forwarding the second 4G-master key comprises forwarding a Handover Request message comprising the key derived from the second 4G-master key and optionally the 4G-freshness parameter to the radio access network of the target 4G wireless communication system. In a particular embodiment, the Handover Request optionally comprises Source to Target Transparent Container, E-RAB Contexts, optionally including S1 UL Tunneling Information, and/or allowed AS integrity and ciphering algorithm(s).

In another particular embodiment, the method also comprises receiving a Handover Request Acknowledgment comprising the 4G-freshness parameter from the radio access network of the target 4G wireless communication system. In a particular embodiment, the Handover Request Acknowledgment optionally comprises Target to Source Transparent Container, S1 DL Tunneling Information for PDU Forwarding and/or NAS security parameters.

In an embodiment, the method also comprises forwarding the 4G-freshness parameter to the user equipment.

In a particular embodiment, forwarding the 4G-freshness parameter to the user equipment comprises forwarding the 4G-freshness parameter to the user equipment via the core network and a radio access network of the source 5G wireless communication system.

In another particular embodiment, forwarding the 4G-freshness parameter to the user equipment comprises transmitting a Relocation Response message comprising the 4G-freshness parameter to the core network of the source 5G wireless communication system, which compiles a Handover Command comprising the 4G-freshness parameter based on the Relocation Response message and forwards the Handover Command to the user equipment via the radio access network of the source 5G wireless communication system. In a particular embodiment, the Relocation Response message also optionally comprises the Target to Source Transparent Container.

The above described embodiments are preferably performed in a key and/or mobility managing entity or functionality of the core network of the target 4G wireless communication system, such as in a core network node comprising such a key and/or mobility managing entity or functionality, e.g., the MME or a core network node comprising the MME.

A further aspect of the embodiments relates to a key management method in connection with handover of a user equipment from a source wireless communication system to a target wireless communication system. The method comprises deriving a first 4G-master key, such as 4G-master key', based on a 5G key, such as $K_{SEAF}$, $K_{MMF}$, $K_{CN}$, $K_{CN-MM}$, $K_{AMF}$, available at the user equipment and a core network of a source 5G wireless communication system, such as NGS, and a 5G-freshness parameter originating from the core network of the source 5G wireless communication system. The method also comprises deriving a second 4G-master key, such as 4G-master key", based on the first 4G-master key and a 4G-freshness parameter available at a core network of a target 4G wireless communication system.

The key management method thereby enables the user equipment to communicate securely with a radio access network of the target 4G wireless communication system using the second 4G-master key or a key, such as $K_{eNB}$, $K_{UPint}$, $K_{UPenc}$, $K_{RRCint}$, and/or $K_{RRCenc}$, derived based on the second 4G-master key and/or communicate securely with a core network of the target 4G wireless communication system using the second 4G-master key or a key, such as $K_{NASint}$ and/or $K_{NASenc}$, derived based on the second 4G-master key.

In an embodiment, the key management method is performed in connection with handover of the user equipment in a connected state. In a particular embodiment, the key management method is performed in connection with handover of the user equipment in a connected state to the source 5G wireless communication system.

In an embodiment, deriving the first 4G-master key comprises deriving, calculating or generating the first 4G-master key by a key deriving function based on the 5G key and the 5G-freshness parameter. In a particular embodiment, deriving the first 4G-master key comprises deriving, calculating or generating the first 4G-master key by a key deriving function based on the 5G key and a concatenation of a FC number and the 5G-freshness parameter.

In an embodiment, deriving the first 4G-master key comprises deriving, calculating or generating the first 4G-master key based on $K_{SEAF}$ and the 5G-freshness parameter.

In an embodiment, deriving the first 4G-master key comprises deriving, calculating or generating the first 4G-master key based on $K_{AMF}$ and the 5G-freshness parameter.

In an embodiment, deriving the first 4G-master key comprises deriving, calculating or generating the first 4G-master key based on $K_{MMF}$ and the 5G-freshness parameter.

In an embodiment, deriving the first 4G-master key comprises deriving, calculating or generating the first 4G-master key based on $K_{CN}$ and the 5G-freshness parameter.

In an embodiment, deriving the first 4G-master key comprises deriving, calculating or generating the first 4G-master key based on $K_{CN-MM}$ and the 5G-freshness parameter.

In an embodiment, deriving the first 4G-master key comprises deriving, calculating or generating a 256-bit 4G-master key based on the 5G key and the 5G-freshness parameter.

In an embodiment, deriving the second 4G-master key comprises deriving, calculating or generating the second 4G-master key by a key deriving function based on the first 4G-master key and the 4G-freshness parameter. In a particular embodiment, deriving the second 4G-master key comprises deriving, calculating or generating the second 4G-master key by a key deriving function based on the first 4G-master key and a concatenation of a FC number and the 4G-freshness parameter.

In an embodiment, deriving the second 4G-master key comprises deriving, calculating or generating a 256-bit 4G-master key based on the first 4G-master key and the 4G-freshness parameter.

In an embodiment, the method also comprises receiving the 5G-freshness parameter from a radio access network of the source 5G wireless communication system, such as from a gNB. In another embodiment, the method also comprises receiving the 5G-freshness parameter and the 4G-freshness parameter from a radio access network of the source 5G wireless communication system, such as from a gNB.

In a particular embodiment, receiving the 5G-freshness parameter comprises receiving a Handover Command comprising the 5G-freshness parameter and optionally the 4G-freshness parameter. In another particular embodiment, the Handover Command optionally also comprises Target to Source Transparent container and/or NAS security parameters.

In an embodiment, the method comprises providing the 4G-freshness parameter from a storage at the user equipment.

In an embodiment, the method comprises deriving at least one NAS key, such as $K_{NASint}$ and/or $K_{NASenc}$, based on the second 4G-master key.

In an embodiment, the method comprises deriving $K_{eNB}$ based on the second 4G-master key. In an optional embodiment, the method also comprises deriving at least one of $K_{UPint}$, $K_{UPenc}$, $K_{RRCint}$, and $K_{RRCenc}$ based on the $K_{eNB}$ derived from or being the second 4G-master key.

The above described embodiments are preferably performed in a key and/or mobility managing entity or functionality of the user equipment.

In an embodiment, the 5G key is available at the core network of the source 5G wireless communication system and the user equipment but not at the core network of the target 4G wireless communication system.

In an embodiment, the 5G-freshness parameter is not available at the core network of the target 4G wireless communication system.

In an embodiment, the 4G-freshness parameter is not available at the core network of the source 5G wireless communication system.

In an embodiment, the 5G-freshness parameter is a counter value.

Yet another aspect of the embodiments relates to a key management arrangement. In an embodiment, the key management arrangement is configured to derive a first 4G-master key, such as 4G-master key', based on i) a 5G key, such as $K_{SEAF}$, $K_{MMF}$, $K_{CN}$, $K_{CN-MM}$ or $K_{AMF}$, available at a core network of a source 5G wireless communication system and a user equipment to be handed over from the source 5G wireless communication system to a target 4G wireless communication system, and ii) a 5G-freshness parameter. The key management arrangement is also configured to forward the first 4G-master key to a core network of the target 4G wireless communication system for enabling deriving a second 4G-master key, such as 4G-master key", based on the first 4G-master key and a 4G-freshness parameter. The key management arrangement is further configured to forward the 5G-freshness parameter to the user equipment for enabling deriving the first 4G-master key based on the 5G key and the 5G-freshness parameter and deriving the second 4G-master key based on the first 4G-master key and the 4G-freshness parameter.

The key management arrangement thereby enables the user equipment to communicate securely with a radio access network of the target 4G wireless communication system using the second 4G-master key or a key, such as $K_{eNB}$, $K_{UPint}$, $K_{UPenc}$, $K_{RRCint}$, and/or $K_{RRCenc}$, derived based on the second 4G-master key and/or communicate securely with a core network of the target 4G wireless communication system using the second 4G-master key or a key, such as $K_{NASint}$ and/or $K_{NASenc}$, derived based on the second 4G-master key.

The key management arrangement may be implemented in or constitute a part of a mobility management arrangement. For instance, the key management arrangement could constitute or form part of the AMF, MMF or CN-MM entities. In either case, the key management arrangement or the mobility management arrangement is preferably implemented in a network unit suitable for operation in connection with the 5G wireless communication system. The network unit could be, but is not limited to, a network device or a network node. In a particular embodiment, the key management arrangement or the mobility management arrangement is comprised in a core network node or distributed among multiple core network nodes of the 5G wireless communication system.

The network device may be any device located in connection with the 5G wireless communication system, including the core network of the 5G wireless communication system. The term network device may also encompass computer-based network devices, such as cloud-based network devices for implementation in cloud-based environments. The network node may by any network node in the 5G wireless communication system, in particular a network node in the core network.

In an embodiment, the key management arrangement is configured to generate the 5G-freshness parameter based on reception of notification message indicating that handover is required.

In an embodiment, the key management arrangement is configured to derive, calculate or generate the first 4G-master key by a key deriving function based on the 5G key and the 5G-freshness parameter. In a particular embodiment, key management arrangement is configured to derive, calculate or generate the first 4G-master key by a key deriving function based on the 5G key and a concatenation of a FC number and the 5G-freshness parameter.

In an embodiment, the key management arrangement is configured to derive, calculate or generate the first 4G-master key based on $K_{SEAF}$ and the 5G-freshness parameter.

In an embodiment, the key management arrangement is configured to derive, calculate or generate the first 4G-master key based on $K_{AMF}$ and the 5G-freshness parameter.

In an embodiment, the key management arrangement is configured to derive, calculate or generate the first 4G-master key based on $K_{MMF}$ and the 5G-freshness parameter.

In an embodiment, the key management arrangement is configured to derive, calculate or generate the first 4G-master key based on $K_{CN}$ and the 5G-freshness parameter.

In an embodiment, the key management arrangement is configured to derive, calculate or generate the first 4G-master key based on $K_{CN-MM}$ and the 5G-freshness parameter.

In an embodiment, the key management arrangement is configured to derive, calculate or generate a 256-bit 4G-master key based on the 5G key and the 5G-freshness parameter.

In an embodiment, the key management arrangement is configured to receive the 5G-freshness parameter from a source mobility managing entity or functionality, such as source AMF, of the core network of the source 5G wireless communication system.

In an embodiment, the key management arrangement is configured to derive the first 4G-master key based on the 5G key and the 5G-freshness parameter in response to a key generation request from a source mobility managing entity or functionality, such as source AMF, of the core network of the source 5G wireless communication system.

In an embodiment, the key management arrangement is configured to forward the first 4G-master key to a target mobility managing entity or functionality, such as target MME, of the core network of the target 4G wireless communication system.

In a particular embodiment, the key management arrangement is configured to forward a Relocation Request message comprising the first 4G-master key to the core network of the target 4G wireless communication system.

In an embodiment, the key management arrangement is configured to forward the 5G-freshenss parameter to the user equipment via a radio access network of the source 5G wireless communication system, such as via a gNB.

In an embodiment, the key management arrangement is configured to receive a Relocation Response message comprising the 4G-freshness parameter from the core network of the target 4G wireless communication system.

In an embodiment, the key management arrangement is configured to forward a Handover Command comprising the 5G-freshness parameter to the user equipment. In a particular embodiment, the Handover Command optionally comprises the 4G-freshness parameter.

Another aspect of the embodiments relates to a key management arrangement. The key management arrangement is configured to receive, from a core network of a source 5G wireless communication system, such as NGS, a first 4G-master key, such as 4G-master key', derived based on i) a 5G key, such as $K_{SEAF}$, $K_{MMF}$, $K_{CN}$, $K_{CN-MM}$ or $K_{AMF}$, available at the core network of the source 5G wireless communication system and a user equipment to be handed over from the source 5G wireless communication system to a target 4G wireless communication system, and ii) a 5G-freshness parameter. The key management arrangement is also configured to derive a second 4G-master key, such as 4G-master key", based on the first 4G-master key and a 4G-freshness parameter.

The key management arrangement thereby enables the user equipment to communicate securely with a radio access network of the target 4G wireless communication system using the second 4G-master key or the key, such as $K_{eNB}$, $K_{UPint}$, $K_{UPenc}$, $K_{RRCint}$, and/or $K_{RRCenc}$, derived based on the second 4G-master key and/or communicate securely with the core network of the target 4G wireless communication system using the second 4G-master key or the key, such as $K_{NASint}$ and/or $K_{NASenc}$, derived based on the second 4G-master key.

The network device may be any device located in connection with the 4G wireless communication system, including the core network of the 4G wireless communication system. The term network device may also encompass computer-based network devices, such as cloud-based network devices for implementation in cloud-based environments. The network node may by any network node in the 4G wireless communication system, in particular a network node in the core network.

The key management arrangement may be implemented in or constitute a part of a mobility management arrangement. For instance, the key management arrangement could constitute or form part of a MME entity. In either case, the key management arrangement or the mobility management arrangement is preferably implemented in a network unit suitable for operation in connection with the 4G wireless communication system. The network unit could be, but is not limited to, a network device or a network node. In a particular embodiment, the key management arrangement or the mobility management arrangement is comprised in a core network node or distributed among multiple core network nodes of the 4G wireless communication system.

In an embodiment, the key management arrangement is configured to generate the 4G-freshness parameter based on reception of the first 4G-master key.

In an embodiment, the key management arrangement is configured to derive, calculate or generate a 256-bit 4G-master key based on the first 4G-master key and the 4G-freshness parameter.

In an embodiment, the key management arrangement is configured to derive, calculate or generate the second 4G-master key by a key deriving function based on the first 4G-master key and the 4G-freshness parameter. In a particular embodiment, the key management arrangement is configured to derive, calculate or generate the second 4G-master key by a key deriving function based on the first 4G-master key and a concatenation of a FC number and the 4G-freshness parameter.

In an embodiment, the key management arrangement is configured to receive, from the core network of the source 5G wireless communication system, a Relocation Request message comprising the first 4G-master key.

In an embodiment, the key management arrangement is configured to forward the second 4G-master key or a key, such as $K_{eNB}$, $K_{UPint}$, $K_{UPenc}$, $K_{RRCint}$, and/or $K_{RRCenc}$, derived from the second 4G-master key to a radio access network of the target 4G wireless communication system.

In another embodiment, the key management arrangement is configured to forward the second 4G-master key or a key, such as $K_{eNB}$, $K_{UPint}$, $K_{UPenc}$, $K_{RRCint}$, and/or $K_{RRCenc}$, derived from the second 4G-master key and the 4G-freshness parameter to a radio access network of the target 4G wireless communication system.

In a particular embodiment, the key management arrangement is configured to forward a Handover Request message comprising the key derived from the second 4G-master key and optionally the 4G-freshness parameter to the radio access network of the target 4G wireless communication system.

In another particular embodiment, the key management arrangement is configured to receive a Handover Request Acknowledgment comprising the 4G-freshness parameter from the radio access network of the target 4G wireless communication system.

In an embodiment, the key management arrangement is configured to forward the 4G-freshness parameter to the user equipment.

A further aspect of the embodiments relates to a key management arrangement. In an embodiment, the key management arrangement is configured to derive a first 4G-master key, such as 4G-master key', based on i) a 5G key, such as $K_{SEAF}$, $K_{MMF}$, $K_{CN}$, $K_{CN-MM}$, $K_{AMF}$, available at a user equipment to be handed over from a source 5G wireless communication system, such as NGS, to a target 4G wireless communication system, such as EPS/LTE, and a core network of the source 5G wireless communication system, and ii) a 5G-freshness parameter originating from the core network of the source 5G wireless communication system. The key management arrangement is also configured to derive a second 4G-master key, such as 4G-master key", based on the first 4G-master key and a 4G-freshness parameter available at a core network of the target 4G wireless communication system.

The key management arrangement thereby enables the user equipment to communicate securely with a radio access network of the target 4G wireless communication system using the second 4G-master key or a key, such as $K_{eNB}$, $K_{UPint}$, $K_{UPenc}$, $K_{RRCint}$, and/or $K_{RRCenc}$, derived based on the second 4G-master key and/or communicate securely with a core network of the target 4G wireless communication system using the second 4G-master key or a key, such as $K_{NASint}$ and/or $K_{NASenc}$, derived based on the second 4G-master key.

The key management arrangement may be implemented in or constitute a part of a mobility management arrangement. In either case, the key management arrangement or the mobility management arrangement is preferably implemented in the user equipment.

User Equipment (UE) may refer to a mobile phone, a cellular phone, a smart phone, a Personal Digital Assistant (PDA) equipped with radio communication capabilities, a laptop or Personal Computer (PC) equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term user equipment should be interpreted as non-limiting terms comprising any type of wireless device communicating with a network node in a wireless communication system. In other words, a wireless communication device may be any device equipped with circuitry for wireless communication in 5G and 4G wireless communication systems, such as NGS and EPS/LTE.

In an embodiment, the key management arrangement is configured to derive, calculate or generate the first 4G-master key by a key deriving function based on the 5G key and the 5G-freshness parameter. In a particular embodiment, the key management arrangement is configured to derive, calculate or generate the first 4G-master key by a key deriving function based on the 5G key and a concatenation of a FC number and the 5G-freshness parameter.

In an embodiment, the key management arrangement is configured to derive, calculate or generate the first 4G-master key based on $K_{SEAF}$ and the 5G-freshness parameter.

In an embodiment, the key management arrangement is configured to derive, calculate or generate the first 4G-master key based on $K_{AMF}$ and the 5G-freshness parameter.

In an embodiment, the key management arrangement is configured to derive, calculate or generate the first 4G-master key based on $K_{MMF}$ and the 5G-freshness parameter.

In an embodiment, the key management arrangement is configured to derive, calculate or generate the first 4G-master key based on $K_{CN}$ and the 5G-freshness parameter.

In an embodiment, the key management arrangement is configured to derive, calculate or generate the first 4G-master key based on $K_{CN-MM}$ and the 5G-freshness parameter.

In an embodiment, the key management arrangement is configured to derive, calculate or generate a 256-bit 4G-master key based on the 5G key and the 5G-freshness parameter.

In an embodiment, the key management arrangement is configured to derive, calculate or generate the second 4G-master key by a key deriving function based on the first 4G-master key and the 4G-freshness parameter. In a particular embodiment, the key management arrangement is configured to derive, calculate or generate the second 4G-master key by a key deriving function based on the first 4G-master key and a concatenation of a FC number and the 4G-freshness parameter.

In an embodiment, the key management arrangement is configured to derive, calculate or generate a 256-bit 4G-master key based on the first 4G-master key and the 4G-freshness parameter.

In an embodiment, the key management arrangement is configured to receive the 5G-freshness parameter from a radio access network of the source 5G wireless communication system, such as from a gNB. In another embodiment, the key management arrangement is configured to receive the 5G-freshness parameter and the 4G-freshness parameter from a radio access network of the source 5G wireless communication system, such as from a gNB.

In a particular embodiment, the key management arrangement is configured to receive a Handover Command comprising the 5G-freshness parameter and optionally the 4G-freshness parameter.

In an embodiment, the key management arrangement is configured to provide the 4G-freshness parameter from a storage at the user equipment.

In an embodiment, the key management arrangement is configured to derive at least one NAS key, such as $K_{NASint}$ and/or $K_{NASenc}$, based on the second 4G-master key.

In an embodiment, the key management arrangement is configured to derive $K_{eNB}$ based on the second 4G-master key. In an optional embodiment, the key management arrangement is configured to derive at least one of $K_{UPint}$, $K_{UPenc}$, $K_{RRCint}$, and $K_{RRCenc}$ based on the $K_{eNB}$ derived from or being the second 4G-master key.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 11:
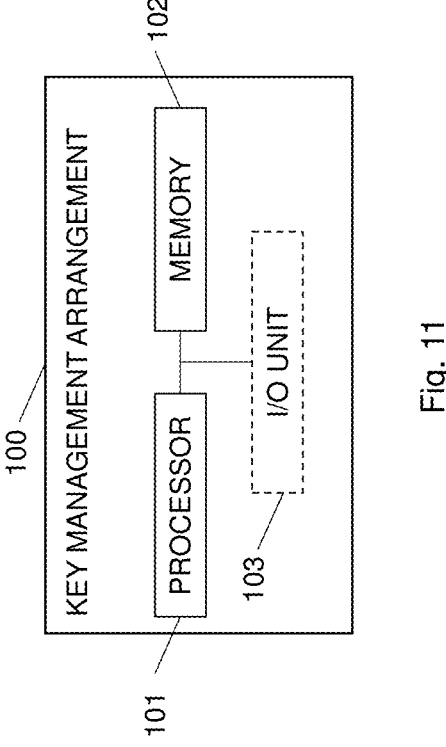
FIG. 11 is a schematic block diagram of a key management arrangement according to an embodiment.

FIG. 11 is a schematic block diagram illustrating an example of a key management arrangement 100 based on a processor-memory implementation according to an embodiment. In this particular example, the key management arrangement 100 comprises a processor 101 and a memory 102. The memory 102 comprises instructions executable by the processor 102, whereby the processor is operative to perform the functions described herein.

Optionally, the key management arrangement 100 may also include a communication circuit 103. The communication circuit 103 may include functions for wired and/or wireless communication with other devices and/or network nodes in the wireless communication system. In a particular example, the communication circuit 103 may be based on radio circuitry for communication with one or more other nodes, including transmitting and/or receiving information. The communication circuit 103 may be interconnected to the processor 101 and/or memory 102. By way of example, the communication circuit 103 may include any of the following: a receiver, a transmitter, a transceiver, input/output (I/O) circuitry, input port(s) and/or output port(s).

Figure 12:
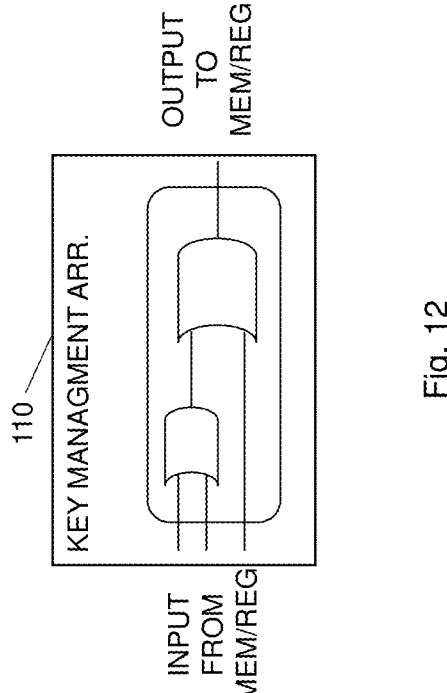
FIG. 12 is a schematic block diagram of a key management arrangement according to another embodiment.

FIG. 12 is a schematic block diagram illustrating another example of a key management arrangement 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 13:
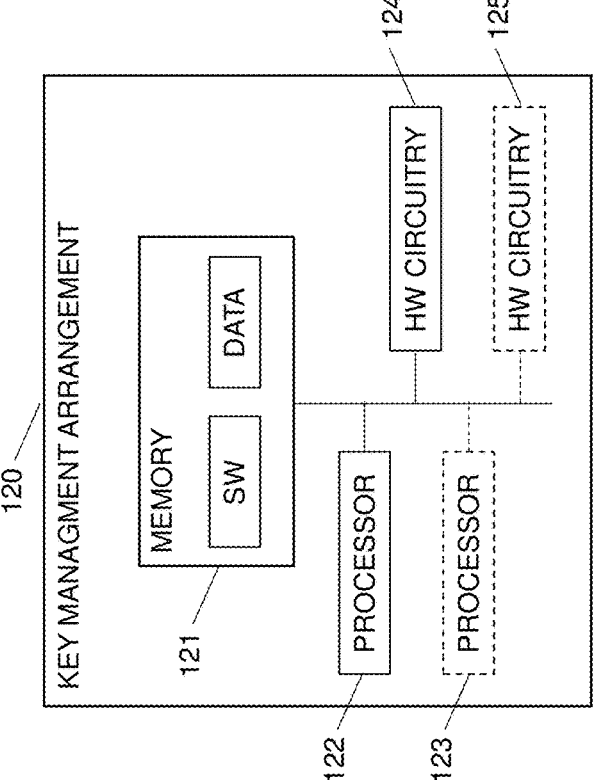
FIG. 13 is a schematic block diagram of a key management arrangement according to a further embodiment.

FIG. 13 is a schematic block diagram illustrating yet another example of a key management arrangement 120 based on combination of both processor(s) 122, 123 and hardware circuitry 124, 125 in connection with suitable memory unit(s) 121. The key management arrangement 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 14:
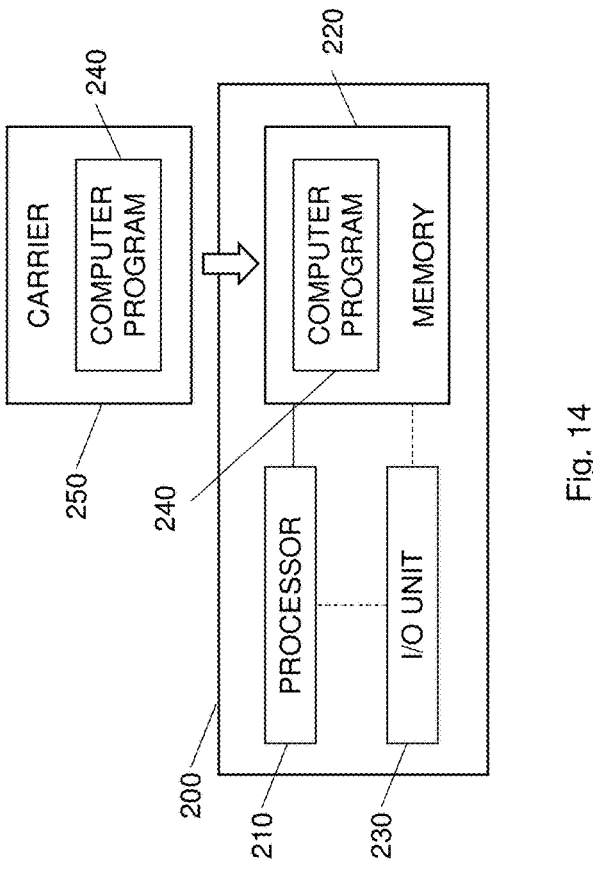
FIG. 14 is a schematic block diagram of a computer-implementation according to an embodiment.

FIG. 14 is a schematic diagram illustrating an example of a computer-implementation 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional input/ output (I/O) device 230 may also be interconnected to the processor(s) 210 and/or the memory 20 to enable input and/or output of relevant data, such as 4G/5G-freshness parameter(s) and/or 4G-master key'.

The term 'processor' should be interpreted in a general sense as any system or device capable of executing program code or computer program instructions to perform a particular processing, determining or computing task.

The processing circuitry including one or more processors 210 is thus configured to perform, when executing a computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processor 210, cause the at least one processor 210 to perform the actions described herein.

In a particular embodiment, the computer program 240 comprises instructions, which when executed by at least one processor 210, cause the at least one processor 210 to derive a first 4G-master key, such as 4G-master key', based on i) a 5G key, such as $K_{SEAF}$, $K_{MMF}$, $K_{CN}$, $K_{CN-MM}$ or $K_{AMF}$, available at a core network of a source 5G wireless communication system and a user equipment to be handed over from the source 5G wireless communication system to a target 4G wireless communication system, and ii) a 5G-freshness parameter.

In an optional embodiment, the at least one processor 210 is also caused to provide the first 4G-master key for transmission to a core network of the target 4G wireless communication system for enabling deriving a second 4G-master key, such as 4G-master key", based on the first 4G-master key and a 4G-freshness parameter. In this embodiment, the at least one processor 210 is further caused to provide the 5G-freshness parameter for transmission to the user equipment for enabling deriving the first 4G-master key based on the 5G key and the 5G-freshness parameter and deriving the second 4G-master key based on the first 4G-master key and the 4G-freshness parameter.

In another particular embodiment, the computer program 240 comprises instructions, which when executed by at least one processor 210, cause the at least one processor 210 to derive a second 4G-master key, such as 4G-master key", based on a 4G-freshness parameter and a first 4G-master key, such as 4G-master key', originating from a core network of a source 5G wireless communication system, such as NGS, and derived based on a i) 5G key, such as $K_{SEAF}$, $K_{MMF}$, $K_{CN}$, $K_{CN-MM}$ or $K_{AMF}$, available at the core network of the source 5G wireless communication system and a user equipment to be handed over from the source 5G wireless communication system to a target 4G wireless communication system, and ii) a 5G-freshness parameter.

In a further embodiment, the computer program 240 comprises instructions, which when executed by at least one processor 210, cause the at least one processor 210 to derive a first 4G-master key, such as 4G-master key', based on i) a 5G key, such as $K_{SEAF}$, $K_{MMF}$, $K_{CN}$, $K_{CN-MM}$, $K_{AMF}$, available at a user equipment to be handed over from a source 5G wireless communication system, such as NGS, to a target 4G wireless communication system, such as EPS/LTE, and a core network of the source 5G wireless communication system, and ii) a 5G-freshness parameter originating from the core network of the source 5G wireless communication system. The at least one processor 210 is also caused to derive a second 4G-master key, such as 4G-master key", based on the first 4G-master key and a 4G-freshness parameter available at a core network of the target 4G wireless communication system.

According to yet another aspect, there is provided a computer program product comprising a computer-readable medium in which a computer program 240 of the above is stored.

The proposed technology also provides a carrier 250 comprising the computer program 240, wherein the carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a computer or equivalent processing device for execution by the processing circuitry 210 thereof.

The method steps presented herein may be regarded as a computer processes, when performed by one or more processors. A corresponding key arrangement apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

FIG. 15 is a schematic diagram illustrating an example of a key management arrangement 130 according to an embodiment. The key management arrangement 130 comprises a key deriving module 131 for deriving a first 4G-master key, such as 4G-master key', based on a i) 5G key, such as $K_{SEAF}$, $K_{MMF}$, $K_{CN}$, $K_{CN-MM}$ or $K_{AMF}$, available at a core network of a source 5G wireless communication system and a user equipment to be handed over from the source 5G wireless communication system to a target 4G wireless communication system, and ii) a 5G-freshness parameter In an optional embodiment, the key management arrangement 130 comprises a key providing module 132 for providing the first 4G-master key for transmission to a core network of the target 4G wireless communication system for enabling deriving a second 4G-master key, such as 4G-master key", based on the first 4G-master key and a 4G-freshness parameter. In this embodiment, or in an alternative embodiment, the key management arrangement 131 optionally also comprises a parameter providing module 133 for providing the 5G-freshness parameter for transmission to the user equipment for enabling deriving the first 4G-master key based on the 5G key and the 5G-freshness parameter and deriving the second 4G-master key based on the first 4G-master key and the 4G-freshness parameter.

FIG. 16 is a schematic diagram illustrating an example of a key management arrangement 140 according to an embodiment. The key management arrangement 140 comprises a key deriving module 141 for deriving a second 4G-master key, such as 4G-master key", based on a 4G-freshness parameter and a first 4G-master key, such as 4G-master key', originating from a core network of a source 5G wireless communication system, such as NGS, and derived based on i) a 5G key, such as $K_{SEAF}$, $K_{MMF}$, $K_{CN}$, $K_{CN-MM}$ or $K_{AMF}$, available at the core network of the source 5G wireless communication system and a user equipment to be handed over from the source 5G wireless communication system to a target 4G wireless communication system, and ii) a 5G-freshness parameter.

FIG. 17 is a schematic diagram illustrating an example of a key management arrangement 150 according to an embodiment. The key management arrangement 150 comprises a first key deriving module 151 for deriving a first 4G-master key, such as 4G-master key', based on i) a 5G key, such as $K_{SEAF}$, $K_{MMF}$, $K_{CN}$, $K_{CN-MM}$, $K_{AMF}$, available at a user equipment to be handed over from a source 5G wireless communication system, such as NGS, to a target 4G wireless communication system, such as EPS/LTE, and a core network of the source 5G wireless communication system, and ii) a 5G-freshness parameter originating from the core network of the source 5G wireless communication system. The key management arrangement 150 also comprises a second key deriving module 152 for deriving a second 4G-master key, such as 4G-master key", based on the first 4G-master key and a 4G-freshness parameter available at a core network of the target 4G wireless communication system.

The proposed technology is generally applicable to management of security contexts in wireless communications. The proposed technology may be applied to many specific applications and communication scenarios including secure communication within wireless networks, securely providing various services within such networks, including so-called Over-the-Top (OTT) services. For example, the proposed technology may provide the underlying security context(s) for secure communication, and enables and/or includes transfer and/or transmission and/or reception of relevant user data and/or control data in wireless communications.

A particular embodiment relates to a method, performed by a wireless device, such as UE, further involving providing user data, and forwarding the user data to a host computer via the transmission to a network node.

Another particular embodiment relates to a corresponding wireless device, such as UE, comprising processing circuitry configured to perform any of the steps of such a method.

A further particular embodiment relates to a method, performed by a network node, such as a base sation, further involving obtaining user data, and forwarding the user data to a host computer or a wireless device.

Another particular embodiment relates to a corresponding network node, such as a base station, comprising processing circuitry configured to perform any of the steps of such a method.

Yet another particular embodiment relates to a corresponding communication system including a host computer and/or wireless device and/or a network node.

It is also becoming increasingly popular to provide computing services (hardware and/or software) in network devices, such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centres, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a sets of applications. In an example embodiment, each of the software containers, also called virtualization engines, virtual private servers, or jails, is a user space instance, typically a virtual memory space. These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

Figure 18:
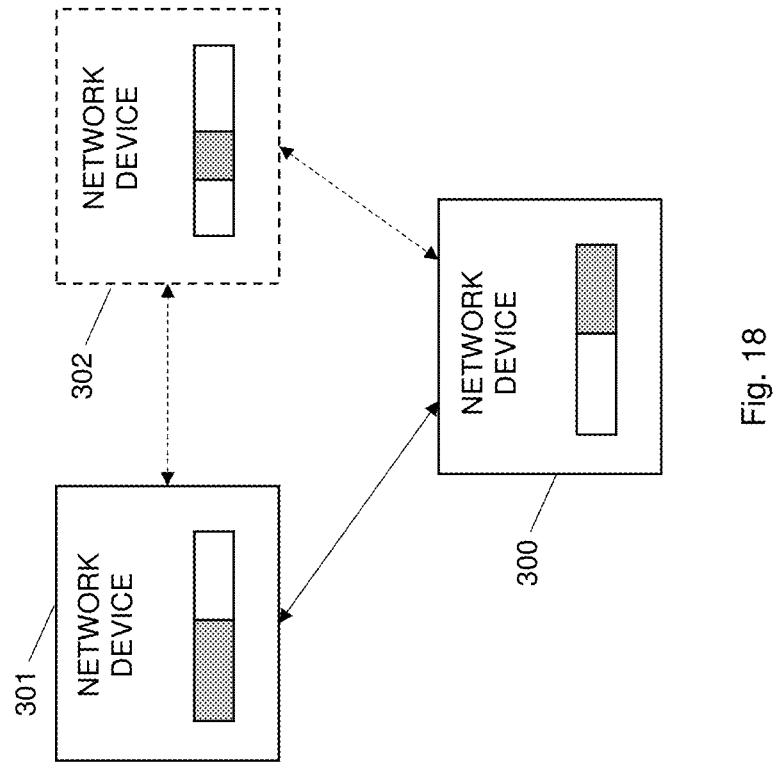
FIG. 18 schematically illustrates a distributed implementation among network devices.

FIG. 18 is a schematic diagram illustrating an example of how functionality can be distributed or partitioned between different network devices in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless or wired communication system, or one or more of the network devices may be so-called cloud-based network devices located outside of the wireless or wired communication system.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A key management method in connection with handover of a user equipment from a source wireless communication system to a target wireless communication system, the method comprises:

deriving a first previous-generation-master key, wherein the first previous-generation-master key is associated with a previous generation of wireless communication technology, based on a subsequent-generation key available at a core network node supporting mobility management of a source subsequent-generation wireless communication system, wherein the subsequent-generation key is associated with a subsequent generation of wireless communication technology, and on a subsequent-generation-freshness parameter, wherein subsequent-generation-freshness parameter is associated with the subsequent generation of wireless communication technology;

forwarding the first previous-generation-master key to a target mobility managing entity of a target previous-generation wireless communication system for enabling deriving a second previous-generation-master key based on the first previous-generation-master key and a previous-generation-freshness parameter; and forwarding the subsequent-generation-freshness parameter to the user equipment for enabling deriving the first previous-generation-master key based on the subsequent-generation key, and the subsequent-generation-freshness parameter and deriving the second previous-generation-master key based on the first previous-generation-master key and the previous-generation-freshness parameter.

2. The method of claim 1, further comprising generating the subsequent-generation-freshness parameter based on reception of a notification message indicating that handover is required from a radio access network (RAN) of the source subsequent-generation wireless communication system.

3. The method of claim 1, wherein forwarding the first previous-generation-master key to the core network of the target previous-generation wireless communication system comprises forwarding a Relocation Request message comprising the first previous-generation-master key to the core network of the target previous-generation wireless communication system.

4. The method of claim 1, wherein forwarding the subsequent-generation-freshness parameter to the user equipment comprises forwarding a subsequent-generation NAS downlink count value to the user equipment via a radio access network of the source subsequent-generation wireless communication system.

5. A key management method in connection with handover of a user equipment from a source wireless communication system to a target wireless communication system, the method comprising:

receiving, at a core network of a target previous-generation wireless communication system and from a core network of a source subsequent-generation wireless communication system, a first previous-generation-master key, wherein the first previous-generation-master key is associated with a previous generation of wireless communication technology, derived based on i) a subsequent-generation key available at the core network of the source subsequent-generation wireless communication system, wherein the subsequent-generation key is associated with a subsequent generation of wireless communication technology, and at the user equipment, and ii) a subsequent-generation-freshness parameter, wherein subsequent-generation-freshness parameter is associated with the subsequent generation of wireless communication technology;

generating a previous-generation-freshness parameter based on reception of the first previous-generation-master key; and a mobility managing entity of the core network of the target previous-generation wireless communication system deriving a second previous-generation-master key based on the first previous-generation-master key and the previous-generation-freshness parameter.

6. The method of claim 5, wherein receiving the first previous-generation-master key comprises receiving, from the core network of the source subsequent-generation wireless communication system, a Relocation Request message comprising the first previous-generation-master key.

7. The method of claim 5, further comprising forwarding the second previous-generation-master key or a key derived from the second previous-generation-master key to a radio access network of the target previous-generation wireless communication system to enable the user equipment to communicate securely with the radio access network of the target previous-generation wireless communication system using the second previous-generation-master key or the key derived based on the second previous-generation-master key.

8. A key management method in connection with handover of a user equipment from a source subsequent-generation wireless communication system to a target previous-generation wireless communication system, the method comprises:

deriving a first previous-generation-master key, wherein the first previous-generation-master key is associated with a previous generation of wireless communication technology, based on i) a subsequent-generation key available at the user equipment and at a core network node supporting mobility management in the source subsequent-generation wireless communication system, wherein the subsequent-generation key is associated with a subsequent generation of wireless communication technology, and ii) a subsequent-generation-freshness parameter originating from a core network of the source subsequent-generation wireless communication system, wherein subsequent-generation-freshness parameter is associated with the subsequent generation of wireless communication technology; and deriving a second previous-generation-master key based on the first previous-generation-master key and a previous-generation-freshness parameter available at a core network node of the target previous-generation wireless communication system.

9. The method of claim 8, further comprising receiving the previous-generation-freshness parameter from the radio access network of the source subsequent-generation wireless communication system, or providing the previous-generation-freshness parameter from a storage at the user equipment.

10. The method of claim 8, further comprising deriving at least one non-access stratum (NAS) key based on the second previous-generation-master key.

11. The method of claim 8, wherein the user equipment is in a connected state to the source subsequent-generation wireless communication system.

12. A key management system configured to:

derive a first previous-generation-master key, wherein the first previous-generation-master key is associated with a previous generation of wireless communication technology, based on i) a subsequent-generation key available at a core network node supporting mobility management in a source subsequent-generation wireless communication system, wherein the subsequent-generation key is associated with a subsequent generation of wireless communication technology, and at a user equipment to be handed over from the source subsequent-generation wireless communication system to a target previous-generation wireless communication system, and ii) a subsequent-generation-freshness parameter, wherein subsequent-generation-freshness parameter is associated with the subsequent generation of wireless communication technology;

forward the first previous-generation-master key to a target mobility managing entity of the target previous-generation wireless communication system for enabling deriving a second previous-generation-master key based on the first previous-generation-master key and a previous-generation-freshness parameter; and forward the subsequent-generation-freshness parameter to the user equipment for enabling deriving the first previous-generation-master key based on the subsequent-generation key and the subsequent-generation-freshness parameter and deriving the second previous-generation-master key based on the first previous-generation-master key and the previous-generation-freshness parameter.

13. The key management system of claim 12, wherein the key management system is configured to generate the subsequent-generation-freshness parameter based on reception of notification message indicating that handover is required.

14. The key management system of claim 12, wherein the key management system is configured to:

receive a Relocation Response message comprising the previous-generation-freshness parameter from the core network of the target previous-generation wireless communication system; and forward a Handover Command comprising the subsequent-generation-freshness parameter and the previous-generation-freshness parameter to the user equipment.

15. A key management system configured to:

receive, from a core network of a source subsequent-generation wireless communication system, a first previous-generation-master key, wherein the first previous-generation-master key is associated with a previous generation of wireless communication technology, derived based on i) a subsequent-generation key available at the core network of the source subsequent-generation wireless communication system, wherein the subsequent-generation key is associated with a subsequent generation of wireless communication technology, and at a user equipment to be handed over from the source subsequent-generation wireless communication system to a target previous-generation wireless communication system, and ii) a subsequent-generation-freshness parameter, wherein subsequent-generation-freshness parameter is associated with the subsequent generation of wireless communication technology;

generate a previous-generation-freshness parameter based on reception of the first previous-generation-master key, and derive a second previous-generation-master key based on the first previous-generation-master key and the previous-generation-freshness parameter.

16. The key management system of claim 15, wherein the key management system is configured to forward the second previous-generation-master key or a key derived from the second previous-generation-master key to a radio access network of the target previous-generation wireless communication system to enable the user equipment to communicate securely with the radio access network of the target previous-generation wireless communication system using the second previous-generation-master key or the key derived based on the second previous-generation-master key.

17. The key management system of claim 15, wherein the key management system is configured to forward the previous-generation-freshness parameter to the user equipment.

18. A key management system configured to:

derive a first previous-generation-master key, wherein the first previous-generation-master key is associated with a previous generation of wireless communication technology, based on i) a subsequent-generation key available at a user equipment to be handed over from a source subsequent-generation wireless communication system to a target previous-generation wireless communication system, wherein the subsequent-generation key is associated with a subsequent generation of wireless communication technology, and at a core network node supporting mobility management in a source subsequent-generation wireless communication system, and ii) a subsequent-generation-freshness parameter originating from the core network of the source subsequent-generation wireless communication system, wherein subsequent-generation-freshness parameter is associated with the subsequent generation of wireless communication technology; and derive a second previous-generation-master key based on the first previous-generation-master key and a previous-generation-freshness parameter available at a core network of the target previous-generation wireless communication system.

19. The key management system of claim 18, wherein the key management system is configured to receive the subsequent-generation-freshness parameter from a radio access network of the source subsequent-generation wireless communication system.

20. The key management system of claim 19, wherein the key management system is configured to receive the previous-generation-freshness parameter from a radio access network of the source subsequent-generation wireless communication system or from a storage at the user equipment.

* * * * *